United States Patent
Watanabe

(10) Patent No.: US 8,462,649 B2
(45) Date of Patent: Jun. 11, 2013

(54) COMMUNICATION DEVICE

(75) Inventor: Yuichi Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 623 days.

(21) Appl. No.: 12/560,630

(22) Filed: Sep. 16, 2009

(65) Prior Publication Data

US 2010/0080219 A1   Apr. 1, 2010

(30) Foreign Application Priority Data

Sep. 29, 2008  (JP) ................................. 2008-250731

(51) Int. Cl.
*H04L 12/66* (2006.01)

(52) U.S. Cl.
USPC ............................ 370/252; 370/352; 709/237

(58) Field of Classification Search
None
See application file for complete search history.

(56) References Cited

U.S. PATENT DOCUMENTS

| | | | | |
|---|---|---|---|---|
| 7,751,091 | B2 * | 7/2010 | Kajiwara | 358/400 |
| 2002/0051173 | A1 * | 5/2002 | Yoshida | 358/1.15 |
| 2004/0057421 | A1 * | 3/2004 | Kawabata et al. | 370/352 |
| 2006/0067301 | A1 * | 3/2006 | Fruth et al. | 370/352 |
| 2006/0109503 | A1 * | 5/2006 | Hong | 358/1.15 |
| 2006/0153108 | A1 * | 7/2006 | Nakajima | 370/286 |
| 2006/0227764 | A1 * | 10/2006 | Miriyala et al. | 370/352 |
| 2006/0274731 | A1 * | 12/2006 | Ito | 370/352 |
| 2008/0002222 | A1 * | 1/2008 | Koide | 358/1.15 |
| 2008/0016358 | A1 * | 1/2008 | Filreis et al. | 713/176 |
| 2010/0260193 | A1 * | 10/2010 | Ulybin | 370/401 |

FOREIGN PATENT DOCUMENTS

| | | |
|---|---|---|
| JP | 2003-087489 | 3/2003 |
| JP | 2003-259098 A | 9/2003 |
| JP | 2005-341506 | 12/2005 |
| JP | 2007-043420 | 2/2007 |

* cited by examiner

*Primary Examiner* — Hassan Phillips
*Assistant Examiner* — Duc Duong
(74) *Attorney, Agent, or Firm* — Kubotera & Associates, LLC.

(57) ABSTRACT

A communication device includes a communication control unit for conducting communication with a destination device according to a first communication sequence or a second communication sequence more suitable for communicating through an IP network than the first communication sequence. The communication device further includes an IP network determining unit for determining whether the communication is conducted through the IP network. When the IP network determining unit determines that the communication is conducted through the IP network, the communication control unit conducts the communication according to the second communication sequence.

6 Claims, 11 Drawing Sheets

| Address | Area | Value | Byte number |
|---|---|---|---|
| 0 | IP network on/off area | ON | 1 |
| 1 | Communication record storage area | Communication record | 2 |
| 3 | Total communication number area | 100 | 4 |
| 7 | IP network error total number area | 5 | 4 |

| | Address | Area | Value | Byte number |
|---|---|---|---|---|
| 1071 | 0 | IP network on/off area | ON | 1 |
| 1072 | 1 | Communication record storage area | Communication record | 2 |
| 1073 | 3 | Total communication number area | 100 | 4 |
| 1074 | 7 | IP network error total number area | 5 | 4 |
| 1075 | 11 | Destination area | Destination information | 4 |

| Abbreviated number | Name | FAX number | IP network setting |
|---|---|---|---|
| 0001 | AAA | 123-5678 | ON |
| 0002 | BBB | 123-5555 | OFF |
| 0003 | CCC | 111-222 | ON |
| ⋮ | ⋮ | ⋮ | ⋮ |

FIG. 11

COMMUNICATION DEVICE

BACKGROUND OF THE INVENTION AND RELATED ART STATEMENT

The present invention relates to a communication device having a facsimile function.

As a conventional communication device, there has been proposed a facsimile device capable of communicating with another facsimile device connected thereto through an analog public telephone line (network) according to the ITU-T standard T.30 (refer to Patent Reference).

Patent Reference: Japanese Patent Publication No. 2003-259098

The conventional communication device starts communication through the following communication protocol. First, the conventional communication device sends a call signal (a CNG signal) to another facsimile device for sending image data to the facsimile device. After the conventional communication device sends the CNG signal, when the conventional communication device receives a digital identification signal (a DIS signal) from the facsimile device indicating a reception capability thereof, the conventional communication device determines a transmission mode (a transmission speed, a size of the image data, and the likes) for transmitting the image data according to the reception capability of the facsimile device and a transmission capability of the conventional communication device. Then, the conventional communication device sends a digital command signal (a DCS signal) to the facsimile device to notify the transmission mode.

In the next step, the conventional communication device sends a training check signal (a TCF signal) to the facsimile device at the transmission speed thus notified to start a modem training, thereby determining whether the facsimile device is capable of receiving the image data at the transmission speed notified with the DCS signal. When the conventional communication device receives a reception ready confirmation signal (a CFR signal) from the facsimile device indicating reception of the TCF signal, the conventional communication device sends the image data to the facsimile device.

On the other hand, when the conventional communication device receives a training failure signal (a FTT signal) from the facsimile device indicating that the facsimile device fails to receive the TCF signal, the conventional communication device adjusts the transmission speed to a slower transmission speed by a specific decrement set in advance due to a modem training failure. Then, the conventional communication sends the DCS signal to the facsimile device for notifying the adjustment of the transmission speed.

Afterward, the conventional communication sends the TCF signal to the facsimile device at the transmission speed thus adjusted. The conventional communication device adjusts the transmission speed, and repeatedly sends and receives the DCS signal and the TCF signal until the conventional communication device receives the CFR signal from the facsimile device.

When an IP (Internet Protocol) telephone adaptor is used, the conventional communication device is connected to an IP network. Accordingly, the conventional communication device is capable of transmitting and receiving various signals and image data to and from a facsimile device through the IP network. When the IP telephone adaptor receives image data having a large file size from the conventional communication device, the IP telephone adaptor divides the image data into a plurality of packets, and transmits the packets to the facsimile device through the IP network.

In the IP network, different from the analog public telephone network, in which one single route is used for transmitting data, a plurality of routes is used for transmitting various signals and a plurality of packets. When a large number of devices connected to the IP network transmit and receive various signals and image data while sharing a plurality of routes, the IP network tends to be crowded. To this end, the IP network has a configuration, in which various signals and packets are temporarily stored in a queue of a router and an accumulation exchange portion, thereby alleviating the congestion of the routes.

In the IP network, when various signals and packets newly arriving queues exceed various signals and packets transmitting to the IP network from the queues, a conflict may occur due to delay in a packet transmission process for waiting for a queue or a large volume of packets, thereby significantly fluctuating the transmission speed of packets.

As described above, in the IP network, the transmission speed of packets may be significantly fluctuated irregularly. Accordingly, when the conventional communication device is communicating with the facsimile device through the IP network, and the conventional communication device adjusts the transmission speed similar to the facsimile communication to the facsimile device through the analog public telephone line, a volume of packets may change when the modem training is performed and when the image data are transmitted. As a result, packets of the image data transmitted at the transmission speed thus adjusted become a queue waiting state, and are not transmitted within a specific period of time from a queue, thereby causing timeout. When the timeout occurs, the conventional communication device is not able to transmit the image data to the facsimile device, thereby causing an error.

In view of the problems described above, an object of the present invention is to provide a communication device capable of solving the problems of the conventional communication device. In the communication device of the present invention, it is arranged to switch between two types of communication sequences having difference communication capabilities. Accordingly, it is possible to smoothly transmit and receive various signals and image data to and from a facsimile device connected to an IP network.

Further objects and advantages of the invention will be apparent from the following description of the invention.

SUMMARY OF THE INVENTION

In order to attain the objects described above, according to the present invention, a communication device includes a communication control unit for conducting communication with a destination device according to a first communication sequence or a second communication sequence more suitable for communicating through an IP network than the first communication sequence. The communication device further includes an IP network determining unit for determining whether the communication is conducted through the IP network. When the IP network determining unit determines that the communication is conducted through the IP network, the communication control unit conducts the communication according to the second communication sequence.

In the present invention, the communication device includes the IP network determining unit for determining whether the destination device as a communication destination is connected through the IP network. When the IP network determining unit determines that the destination device is connected through the IP network, the communication control unit conducts the communication according to the second communication sequence more suitable for communicating through an IP network than the first communication sequence. Accordingly, it is possible to smoothly transmit and receive data between the communication device and the destination device.

BRIEF DESCRIPTION OF THE DRAWINGS

FIG. 4 is a schematic view showing a configuration of a system memory according to the first embodiment of the present invention;

FIG. 10 is a schematic view showing a configuration of a system memory according to the third embodiment of the present invention;

FIG. 11 is a schematic view showing a destination area of the system memory according to the third embodiment of the present invention.

DETAILED DESCRIPTION OF PREFERRED EMBODIMENTS

Hereunder, embodiments of the present invention will be explained with reference to the accompanying drawings.

First, a transmission sequence of facsimile communication will be explained with reference to FIG. 3.

The facsimile communication is conducted using a modem compliant with the V.8 sequence of the ITU-T standard T.30 and the V.34 standard.

Figure 3:
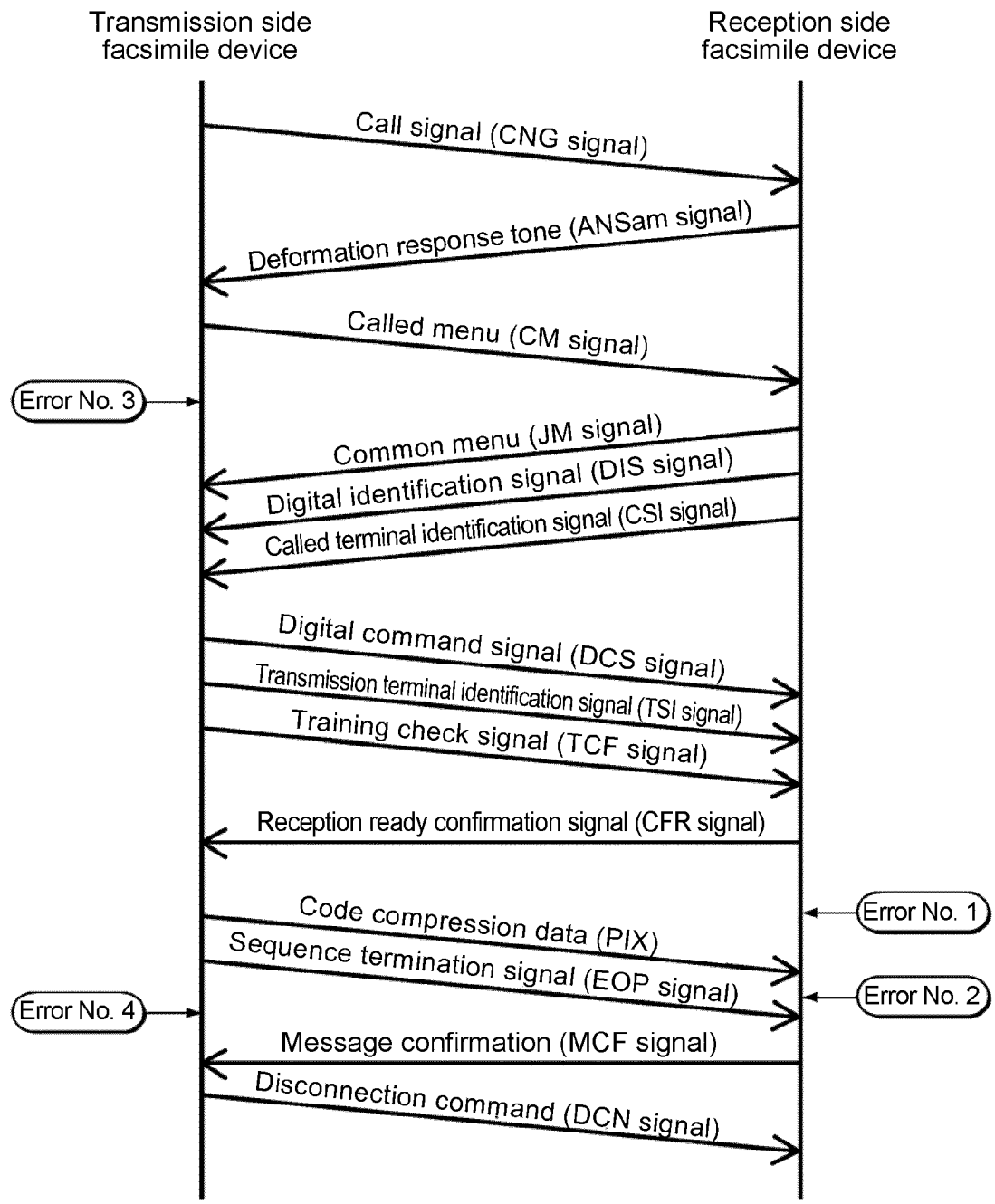
FIG. 3 is a schematic view showing a communication sequence of a facsimile device.

FIG. 3 is a schematic view showing a communication sequence of a facsimile device. As shown in FIG. 3, as a preparation step before a transmission side facsimile device conducts the facsimile communication with a reception side facsimile device, the transmission side facsimile device sends a call signal (a CNG signal) to the reception side facsimile device for establishing a communication line therebetween.

When the reception side facsimile device receives the call signal (the CNG signal), the reception side facsimile device responds to the transmission side facsimile device. Accordingly, the communication line is established between the reception side facsimile device and the transmission side facsimile device.

When the communication line is established between the reception side facsimile device and the transmission side facsimile device, the reception side facsimile device sends a deformation response tone (an ANSam signal) to the transmission side facsimile device. When the transmission side facsimile device receives the deformation response tone (the ANSam signal), the transmission side facsimile device sends a called menu (a CM signal) to the reception side facsimile device indicating that the transmission side facsimile device is a facsimile device.

When the reception side facsimile device receives the called menu (the CM signal), the reception side facsimile device sends a common menu (a JM signal) to the transmission side facsimile device indicating that the reception side facsimile device is a facsimile device. When the transmission side facsimile device and the reception side facsimile device identify that the transmission side facsimile device and the reception side facsimile device are the facsimile devices, the facsimile communication starts according to the V.8 standard.

Afterward, the reception side facsimile device sends a digital identification signal (a DIS signal) indicating a reception capability thereof such as a reception speed, and a called terminal identification signal (a CSI signal) indicating identification information to the transmission side facsimile device.

When the transmission side facsimile device receives the digital identification signal (the DIS signal) and the called terminal identification signal (the CSI signal), the transmission side facsimile device determines a size of image data to be transmitted; a line density of the image data; a code compression format of the image data; a modem speed in transmitting the image data code compressed; and the likes according to the reception capability and the identification information of the reception side facsimile device, and transmission capability and identification information of the transmission side facsimile device.

Then, the transmission side facsimile device generates a digital command signal (a DCS signal) for notifying a determination result, and sends the digital command signal (the DCS signal) and a transmission terminal identification signal (a TSI signal) indicating the identification information of the transmission side facsimile device to the reception side facsimile device.

In the next step, the transmission side facsimile device sends a training check signal (a TCF signal) to the reception side facsimile device at the modem speed, so that a modem training starts for determining whether the reception side facsimile device is capable of receiving the image data at the modem speed notified with the digital command signal (the DCS signal).

After the reception side facsimile device receives the digital command signal (the DCS signal) and the transmission terminal identification signal (the TSI signal), when the reception side facsimile device receives the training check signal (the TCF signal), the reception side facsimile device sends a reception ready confirmation signal (a CFR signal) to the transmission side facsimile device in response to the TCF signal.

On the other hand, when the reception side facsimile device does not receive the training check signal (the TCF signal), the reception side facsimile device sends a training failure signal (an FTT signal) to the transmission side facsimile device. Accordingly, the transmission side facsimile device decreases the modem speed stepwise, and repeatedly sends to the reception side facsimile device the digital command signal (the DCS signal), the transmission terminal identification signal (the TSI signal), and the training check signal (the TCF signal) until the transmission side facsimile device receives the reception ready confirmation signal (the CFR signal) from the reception side facsimile device.

When the transmission side facsimile device receives the reception ready confirmation signal (the CFR signal), the transmission side facsimile device compresses the image data having the size and the line density notified with the digital command signal (the DCS signal) according to the code compression format specified with the digital command signal (the DCS signal) to generate a code compression data (PIX). Then, the transmission side facsimile device sends the code compression data (the PIX) to the reception side facsimile device.

After the transmission side facsimile device sends all of the code compression data (the PIX), the transmission side facsimile device sends a sequence termination signal (an EOP signal) to the reception side facsimile device. In this case, when the transmission side facsimile device is connected to the reception side facsimile device through the IP network, a VoIP adaptor connected to the transmission side facsimile device divides the code compression data (the PIX) into packets and transmits the packets into the IP network. Then, a VoIP adaptor connected to the reception side facsimile device assembles the packets into the code compression data (the PIX).

When the reception side facsimile device receives the code compression data (the PIX), the reception side facsimile device expands and decompresses the code compression data (the PIX) with a decompression method corresponding to the code compression format specified with the digital command signal (the DCS signal), thereby restoring the image data. Then, the reception side facsimile device performs a printing operation according to the image data.

When the reception side facsimile device receives the sequence termination signal (the EOP signal), the reception side facsimile device sends a message confirmation (an MCF signal) to the transmission side facsimile device. Afterward, the reception side facsimile device performs the printing operation according to the entire image data thus received.

When the transmission side facsimile device receives the message confirmation (the MCF signal), the transmission side facsimile device sends a disconnection command (a DCN signal) to the reception side facsimile device for disconnecting the communication line established between the transmission side facsimile device and the reception side facsimile device.

When the reception side facsimile device receives the disconnection command (the DCN signal), the reception side facsimile device disconnects the communication line established between the transmission side facsimile device and the reception side facsimile device. Accordingly, the communication process between the transmission side facsimile device and the reception side facsimile device is completed.

In the facsimile communication described above, when the reception side facsimile device does not receive the signal or the code compression data (the PIX) transmitted from the transmission side facsimile device, i.e., an error in the facsimile communication, the transmission side facsimile device sends the signal or the code compression data (the PIX) for a specific number of times using a re-transmission function thereof. In this case, the transmission side facsimile device stores the error as a transmission error in a memory disposed in the transmission side facsimile device as a communication history, and the reception side facsimile device stores the error as a reception error in a memory disposed in the reception side facsimile device as a communication history. Note that the reception side facsimile device has a re-transmission function thereof of the signal similar to the transmission side facsimile device.

First Embodiment

Figure 1:
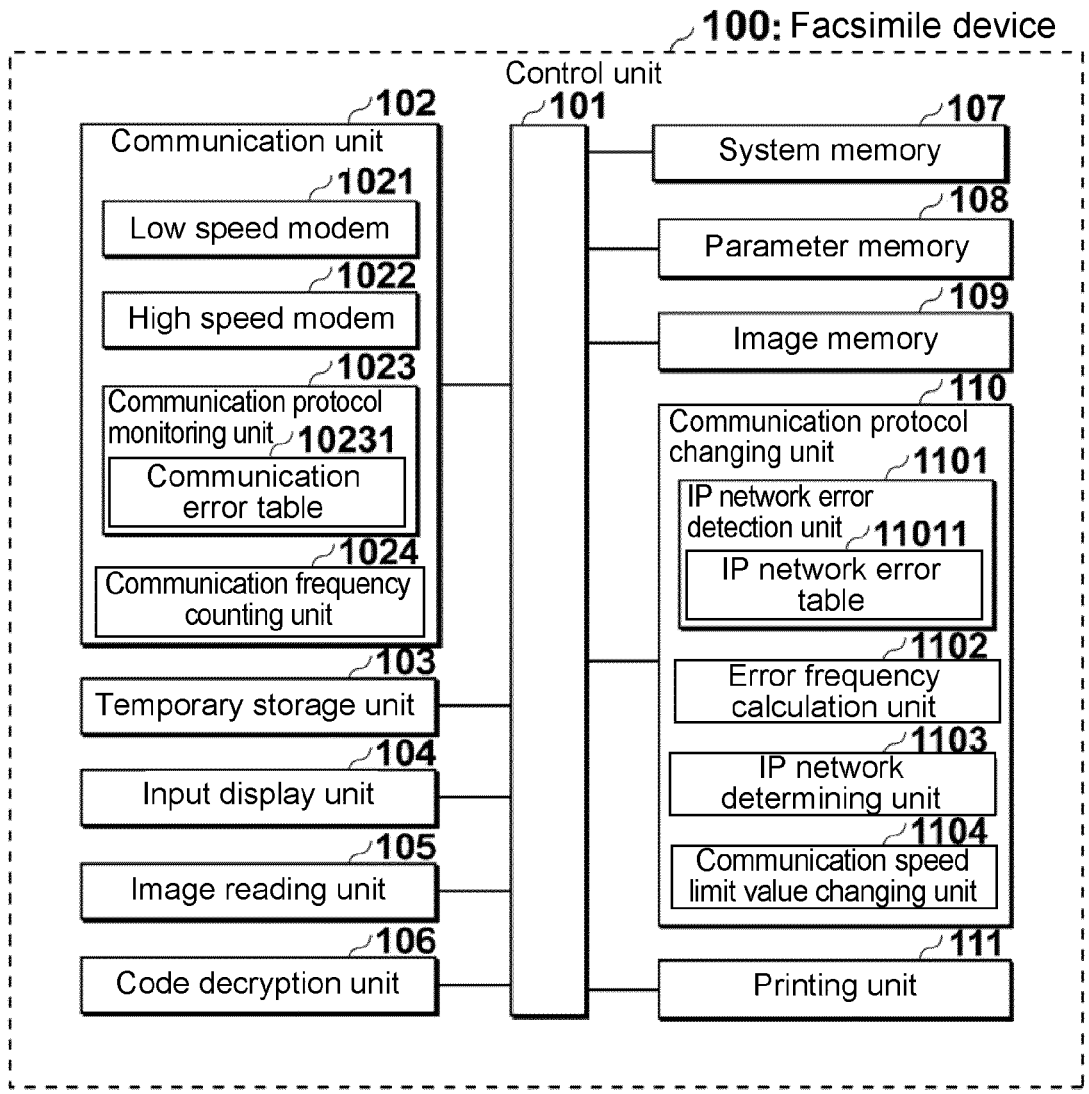
FIG. 1 is a schematic block diagram showing a configuration of a facsimile device according to a first embodiment of the present invention.
Figure 2:
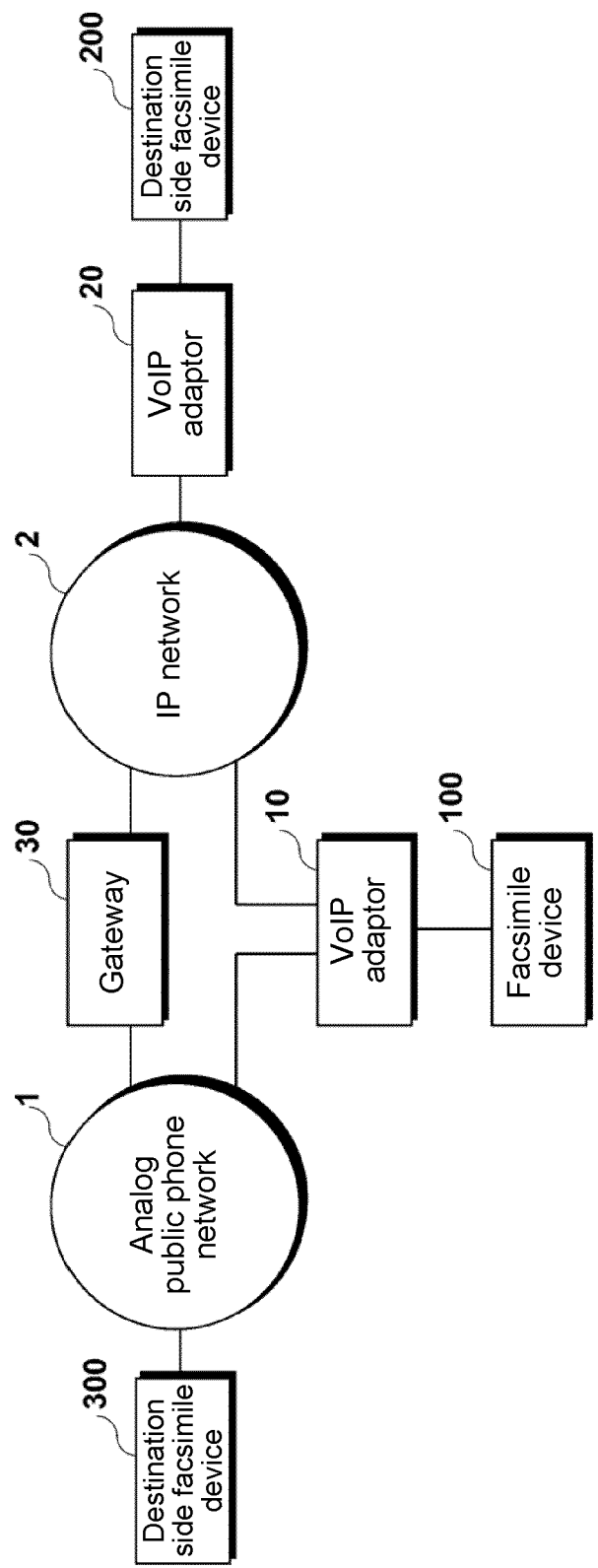
FIG. 2 is a schematic view showing a communication network according to the first embodiment of the present invention.

A first embodiment of the present invention will be explained. FIG. 1 is a schematic block diagram showing a configuration of a facsimile device 100 according to the first embodiment of the present invention. FIG. 2 is a schematic view showing a communication network according to the first embodiment of the present invention.

As shown in FIG. 2, the facsimile device 100 is connected to an analog public telephone network 1 and an IP network 2 through a VoIP adaptor 10. The analog public telephone network 1 is connected to the IP network 2 through a gateway 30. A destination side facsimile device 200 is connected to the IP network 2 through a VoIP adaptor 20. A destination side facsimile device 300 is connected to the analog public phone network 1.

In the embodiment, the VoIP adaptor 10 is connected to the IP network 2 when the facsimile device 100 conducts the facsimile communication with the destination side facsimile device 200, and is connected to the analog public telephone network 1 when the facsimile device 100 conducts the facsimile communication with the destination side facsimile device 300. Note that the destination side facsimile device 200 and the destination side facsimile device 300 are G3 (group 3) facsimile devices.

As shown in FIG. 1, the facsimile device 100 includes a control unit 101 for controlling an entire operation of the facsimile device 100; a communication unit 102; a temporary storage unit 103; an input display unit 104 having a plurality of buttons and a touch panel; an image reading unit 105; a code decryption unit 106; a system memory 107; a parameter memory 108 for storing various setting values for an operation of the facsimile device 100; an image memory 109; a communication protocol changing unit 110; and a printing unit 111. The facsimile device 100 is a G3 facsimile device capable of conducting the facsimile communication according to the V.8 sequence and the V.34 standard in compliance with of the ITU-T standard T.30, and is generally installed in an office and the likes.

An operation of the facsimile device 100 as the transmission side facsimile device will be explained next. First, an operator places an original on an original stage (not shown) or a manual tray (not shown) of the facsimile device 100, and pushes a start button of the input display unit 104, thereby instructing the facsimile communication. When the start button is pushed, the control unit 101 instructs the image reading unit 105 to read an image on the original.

Before the operator pushes the start button, the operator operates the buttons and the touch panel of the input display unit 104 to set a fax number of the destination side facsimile device 200 or the destination side facsimile device 300 as the reception side facsimile device and various setting values such as an image resolution. The control unit 101 controls to store the setting values in the temporary storage unit 103.

When the control unit 101 instructs the image reading unit 105 to read the image on the original, the image reading unit 105 optically reads the image on the original placed on the original stage (not shown) or transported from the manual tray (not shown) to the original stage, thereby generating image data per original. The image data generated with the image reading unit 105 are a bitmap image formed of color pixels. The image data are not limited to the bitmap image formed of the color pixels, and may be a bitmap image formed of monochrome pixels.

In the embodiment, the control unit 101 has a count function of counting a number of originals per job. Accordingly, the control unit 101 automatically controls to add image identification information to the image data thus generated. The image identification information includes a job ID for identifying the image data and a page number. Further, the control unit 101 adds a last page symbol indicating a last page number as the image identification information to the image data of the original corresponding to a last page of each job. With the image identification information, it is possible for the reception side facsimile device as a transmission destination of the image data to perform a printing operation according to the image data in an order of the page numbers.

In the embodiment, every time when the image reading unit 105 generates the image data, the control unit 101 stores the image data in the image memory 109. When the control unit 101 stores the image data with the last page symbol, the control unit 101 generates the call signal (the CNG signal) for calling the reception side facsimile device, and sends the call signal to the communication unit 102. The fax number of the reception side facsimile device stored in the temporary storage unit 103 and a fax number of the facsimile device 100 stored in the parameter memory 108 are automatically added to the call signal (the CNG signal).

In the embodiment, the communication unit 102 conducts the facsimile communication with the reception side facsimile device (the destination side facsimile device 200 or the destination side facsimile device 300) according to the ITU-T standard T.30.

As shown in FIG. 1, the communication unit 102 includes a low speed modem 1021; a high speed modem 1022; a communication protocol monitoring unit 1023; and a communication frequency counting unit 1024.

In the embodiment, the low speed modem 1021 includes, for example, a V.21 modem (a communication speed of 300 bps, full duplex) for transmitting and receiving code compressed data with the reception side facsimile device. The high speed modem 1022 includes a V.34 modem (a communication speed of 33.5 kbps, full duplex); a V.17 modem (a communication speed of 14.4 kbps (upload) and 12.0 kbps (upload), full duplex); a V.29 modem (a communication speed of 9.6 kbps (upload) and 7.2 kbps (upload)); and a V.27ter modem (a communication speed of 4.8 kbps (upload) and 2.4 kbps (upload)) for transmitting and receiving code compressed data with the reception side facsimile device.

In the embodiment, the communication protocol monitoring unit 1023 monitors whether the facsimile device 100 conducts the facsimile communication with the reception side facsimile device according to a communication sequence of the ITU-T standard T.30. As shown in FIG. 1, the communication protocol monitoring unit 1023 includes a communication error table 10231. The communication error table 10231 stores various communication errors occurred during the facsimile communication and various error numbers attached to the communications errors.

When the communication protocol monitoring unit 1023 detects a communication error in transmission or reception of various sequence signals or the code compression data (the PIX) during the facsimile communication according to the communication sequence of the ITU-T standard T.30, the communication protocol monitoring unit 1023 searches an error number corresponding to the communication error from the communication error table 10231. Then, the communication protocol monitoring unit 1023 generates an error detection signal with the error number attached thereto, and sends the error detection signal to the control unit 101.

When the control unit 101 receives the error detection signal, the control unit 101 stores the error number in a communication record storage area 1072 (described later) of the system memory 107. The communication record storage area 1072 stores the error number of the communication error occurred during the facsimile communication from when a communication line is established with the reception side facsimile device to when the communication line is disconnected. The communication record storage area 1072 also stores a total number of the communication error when the communication error occurs.

In the embodiment, the communication frequency counting unit 1024 counts a communication total number indicating a number of times when the facsimile device 100 transmits and receives the various sequence signals and the code compression data (the PIX) with the reception side facsimile device during the facsimile communication from when the communication line is established with the reception side facsimile device to when the communication line is disconnected. Every time when the communication frequency counting unit 1024 counts the communication total number, the communication total number is stored in a total communication number area 1073 (described later) of the system memory 107 through the control unit 101.

When the communication unit 102 receives the call signal (the CNG signal) from the control unit 101, the communication unit 102 sends the call signal to the fax number of the reception side facsimile device attached to the call signal through the VoIP adaptor 10. In the following process, the fax number of the facsimile device 100 and the fax number of the reception side facsimile device are attached to the various sequence signals communicated between the facsimile device 100 and the reception side facsimile device.

In the next step, after the communication unit 102 receives the common menu (the JM signal) from the reception side facsimile device, when the communication unit 102 receives the digital identification signal (the DIS signal) and the called terminal identification signal (the CSI signal) from the reception side facsimile device, the control unit 101 stores the reception capability of the reception side facsimile device attached to the digital identification signal (the DIS signal) and the identification information of the reception side facsimile device attached to the called terminal identification signal (the CSI signal) in the temporary storage unit 103. After the control unit 101 stores the reception capability and the identification information of the reception side facsimile device, the control unit 101 instructs the communication protocol changing unit 110 to determine whether the communication protocol is changed.

FIG. 4 is a schematic view showing a configuration of the system memory 107 according to the first embodiment of the present invention. As shown in FIG. 4, the system memory 107 includes an IP network on/off area 1071; the communication record storage area 1072; the total communication number area 1073; and an IP network error total number area 1074.

In the embodiment, the communication protocol changing unit 110 determines whether the communication protocol (the V.34 standard) of the facsimile device 100 is changed. As shown in FIG. 1, the communication protocol changing unit 110 includes an IP network error detection unit 1101; an error frequency calculation unit 1102; an IP network determining unit 1103; and a communication speed limit value changing unit 1104. When the communication protocol changing unit 110 receives the instruction of determining the communication protocol, the communication protocol changing unit 110 instructs the IP network error detection unit 1101 to detect an IP network error.

In the embodiment, the IP network error detection unit 1101 detects a total number of the communication errors occurred due to the communication via the IP network 2 from the various error numbers and the frequencies thereof stored in the communication record storage area 1072 of the system memory 107. As shown in FIG. 1, the IP network error detection unit 1101 includes an IP network error table 11011.

In the embodiment, the IP network error table 11011 stores the error numbers of the IP network errors as the communication errors occurred due to the communication between the facsimile device 100 and the reception side facsimile device through the IP network 2 among the communication errors occurred in the facsimile device 100.

Among the IP network errors, an error No. 1 to an error No. 4 will be explained next. The error No. 1 as the IP network error corresponds to a situation in which a line termination end signal (an EOL signal) is not detected in a reception phase C for 13 seconds, or a T1 timer frame is not received. More specifically, the error No. 1 occurs when a front fag of the code compression data (the PIX) is not detected for 13 seconds during the facsimile communication between the facsimile device 100 and the reception side facsimile device due to discard or delay of the various signals and the packets in the IP network 2 after the reception ready confirmation signal (the CFR signal) is transmitted. The error No. 1 as the IP network error occurs at a timing shown in FIG. 3.

The error No. 2 as the IP network error corresponds to a situation in which an invalid command is received when an instruction is received in a reception phase D. More specifically, the error No. 2 occurs when the sequence termination signal (the EOP signal) is destroyed during the facsimile communication between the facsimile device 100 and the reception side facsimile device due to the discard or delay of the various signals and the packets in the IP network 2 when the reception side facsimile device waits for the sequence termination signal (the EOP signal) after the code compression data (the PIX) are completely received. The error No. 2 as the IP network error occurs at a timing shown in FIG. 3.

The error No. 3 as the IP network error corresponds to a situation in which the common menu (the JM signal) without a V.34 function is received during transmission. More specifically, the error No. 3 occurs when the common menu (the JM signal) is destroyed during the facsimile communication between the facsimile device 100 and the reception side facsimile device due to the discard or delay of the various signals and the packets in the IP network 2 when the facsimile device 100 waits for the common menu (the JM signal) after the called menu (the CM signal) is transmitted in the phase B of a sequence of ITU-T standard V.34. The error No. 3 as the IP network error occurs at a timing shown in FIG. 3.

The error No. 4 as the IP network error corresponds to a situation in which a response reception error occurs during a transmission phase D. More specifically, the error No. 4 occurs when message confirmation (an MCF signal) is destroyed during the facsimile communication between the facsimile device 100 and the reception side facsimile device due to the discard or delay of the various signals and the packets in the IP network 2 when the facsimile device 100 waits for the message confirmation (the MCF signal) after the sequence termination signal (the EOP signal) is transmitted. The error No. 4 as the IP network error occurs at a timing shown in FIG. 3.

When the IP network error detection unit 1101 receives the instruction to detect the IP network error, the IP network error detection unit 1101 searches the error numbers and the frequencies of the various communication errors stored in the communication record storage area 1072 of the system memory 107, so that the IP network error detection unit 1101 detects the total number of the IP network error indicating the total number of the communication error corresponding to the error number of the IP network error stored in the IP network error table 11011. After the IP network error detection unit 1101 detects the total number of the IP network error, the total number of the IP network error is stored in the IP network error total number area 1074 of the system memory 107 through the control unit 101.

When the total number of the IP network error is stored in the IP network error total number area 1074 of the system memory 107, the communication protocol changing unit 110 instructs the error frequency calculation unit 1102 to calculate the frequency of the IP network error. In the embodiment, the error frequency calculation unit 1102 calculates the frequency of the IP network error occurred during the facsimile communication from when the communication line is established between the facsimile device 100 and the reception side facsimile device to when the communication line is disconnected.

More specifically, when the communication protocol changing unit 110 instructs the error frequency calculation unit 1102 to calculate the frequency of the IP network error, the error frequency calculation unit 1102 divides the total number of the IP network error stored in the IP network error total number area 1074 of the system memory 107 by a total communication number stored in the total communication number area 1073 of the system memory 107, thereby calculating the frequency of the IP network error. After the error frequency calculation unit 1102 calculates the frequency of the IP network error, the temporary storage unit 103 stores the frequency of the IP network error through the control unit 101.

An example of the frequency of the IP network error calculated with the error frequency calculation unit 1102 will be explained next. It is supposed that, when the facsimile device 100 conducts the communication with the reception side facsimile device, for example, one hundred times, the IP network error caused by content error of the JM signal occurs twice, and the IP network error of not detecting the EOL signal for 13 seconds in the reception phase C occurs three times. In this case, the error frequency calculation unit 1102 divides five, i.e., the total number of the IP network errors (two of the IP network error caused by the content error of the JM signal, and three of the IP network error of not detecting the EOL signal for 13 seconds in the reception phase C) by one hundred, i.e., the total communication number. Accordingly, the error frequency calculation unit 1102 calculates the frequency of the IP network error as 5%.

When the error frequency calculation unit 1102 calculates the frequency of the IP network error, the communication protocol changing unit 110 instructs the IP network determining unit 1103 to determine the IP network 2. In the embodiment, the IP network determining unit 1103 determines whether the facsimile device 100 is connected to the reception side facsimile device through the IP network 2 according to a determination whether the frequency of the IP network error calculated with the error frequency calculation unit 1102 exceeds a standard error frequency value set in advance.

When a conventional facsimile device is connected to a reception side facsimile device through an analog network, a frequency of an IP network error is found to be less than 1%. Further, when the conventional facsimile device is connected to the reception side facsimile device through the IP network, a frequency of an IP network error under the V.34 standard is found to be 2.9%. Accordingly, in the embodiment, the standard error frequency value is set at 2%, and is stored in the parameter memory 108.

In the embodiment, after the communication protocol changing unit 110 instructs the IP network determining unit 1103 to determine the IP network 2, when the frequency of the IP network error stored in the temporary storage unit 103 exceeds the standard error frequency value stored in the parameter memory 108, the IP network determining unit 1103 determines that the facsimile device 100 is connected to the reception side facsimile device through the IP network 2. Accordingly, the IP network determining unit 1103 generates an IP network connection on signal, and sends the IP network connection on signal to the control unit 101.

When the frequency of the IP network error is smaller than the standard error frequency value, the IP network determining unit 1103 determines that the facsimile device 100 is not connected to the reception side facsimile device through the IP network. Accordingly, the IP network determining unit 1103 generates an IP network connection off signal, and sends the IP network connection off signal to the control unit 101.

When the control unit 101 receives the IP network connection on signal, the control unit 101 set a value of the IP network on/off area 1071 of the system memory 107 to on. In the facsimile device 100 of the embodiment, the value of the IP network on/off area 1071 of the system memory 107 is determined according to the determination result of the IP network determining unit 1103. Alternatively, the value of the IP network on/off area 1071 may be determined according to a determination of an operator through the touch panel of the input display unit 104.

When the value of the IP network on/off area 1071 is determined by the operator, it is possible to set the value of the IP network on/off area 1071 to on without the determining process of the IP network determining unit 1103 in a case that the operator is aware that the facsimile device 100, i.e., the device the operator is operating, is connected to the reception side facsimile device through the IP network 2. Accordingly, it is possible to quickly set the value of the IP network on/off area 1071 to on, i.e., the value corresponding to the IP network 2. As a result, it is possible to eliminate the determining process of the IP network determining unit 1103 for calculating the frequency, and to prevent an error during the facsimile communication between the facsimile device 100 and the reception side facsimile device, thereby reducing communication cost.

When the control unit 101 receives the IP network connection off signal, the control unit 101 set the value of the IP network on/off area 1071 of the system memory 107 to off. When the control unit 101 set the value of the IP network on/off area 1071 of the system memory 107 to on or off according to the determination result of the IP network determining unit 1103, the communication protocol changing unit 110 instructs the communication speed limit value changing unit 1104 to determine whether a communication speed limit value is changed.

In the embodiment, the communication speed limit value changing unit 1104 determines whether the communication speed limit value of the facsimile device 100 is changed from the communication speed of the V.34 modem to the communication speed of the V.17 modem depending on whether the facsimile device 100 is connected to the reception side facsimile device through the IP network 2. More specifically, when the communication protocol changing unit 110 instructs the communication speed limit value changing unit 1104 to determine whether the communication speed limit value is changed, the communication speed limit value changing unit 1104 searches the IP network on/off area 1071 of the system memory 107. When the value of the IP network on/off area 1071 of the system memory 107 is set to on, the communication speed limit value changing unit 1104 changes the communication speed limit value of the facsimile device 100 to the communication speed of the V.17 modem (14.8 kbps).

On the other hand, when the value of the IP network on/off area 1071 of the system memory 107 is set to off, the communication speed limit value changing unit 1104 maintains the communication speed limit value of the facsimile device 100 at the communication speed of the V.34 modem (36.6 kbps).

When the communication speed limit value changing unit 1104 changes the communication speed limit value of the facsimile device 100 to the communication speed of the V.17 modem, the communication unit 102 set the modem speed of the facsimile device 100 to the communication speed of the V.17 modem.

On the other hand, when the communication speed limit value changing unit 1104 does not change the communication speed limit value, the communication unit 102 set a modem speed capable of communicating between the facsimile device 100 and the reception side facsimile device according to the communication speed of the V.34 modem stored in the parameter memory 108 and the reception capability of the reception side facsimile device stored in the temporary storage unit 103.

In the embodiment, as described above, the communication speed limit value changing unit 1104 changes the communication speed limit value of the facsimile device 100 to the communication speed of the V.17 modem, thereby preventing the communication error. Alternatively, the communication speed limit value changing unit 1104 may change the communication speed limit value of the facsimile device 100 according to communication capability, or the communication speed limit value changing unit 1104 may change the communication speed limit value of the facsimile device 100 to a communication standard capable of dealing with more various facsimile devices.

When the communication unit 102 sets the modem speed, the control unit 101 generates the digital command signal (the DCS signal) to notify communication conditions to the reception side facsimile device, and sends the digital command signal (the DCS signal) to the communication unit 102. The communication conditions include the modem speed thus set; the device capabilities of the facsimile device 100 and the reception side facsimile device; the size, the line density, and the code compression format of the image data determined from the identification information; and the likes. The size, the line density, and the code compression format of the image data to be transmitted may be determined with a well-known method, and an explanation thereof is omitted.

After the control unit 101 sends the digital command signal (the DCS signal) to the communication unit 102, the control unit 101 generates the transmission terminal identification signal (the TSI signal), and sends the transmission terminal identification signal (the TSI signal) to the communication unit 102.

After the control unit 101 sends the transmission terminal identification signal (the TSI signal) to the communication unit 102, the control unit 101 generates the training check signal (the TCF signal) for conducting the modem training at the communication speed of the facsimile communication between the facsimile device 100 and the reception side facsimile device, and sends the training check signal (the TCF signal) to the communication unit 102.

When the communication unit 102 receives the digital command signal (the DCS signal), the transmission terminal identification signal (the TSI signal), and the training check signal (the TCF signal), the communication unit 102 sequentially sends the digital command signal (the DCS signal), the transmission terminal identification signal (the TSI signal), and the training check signal (the TCF signal) to the reception side facsimile device through the VoIP adaptor 10.

When the communication unit 102 receives the reception ready confirmation signal (the CFR signal) from the reception side facsimile device in response to the digital command signal (the DCS signal), the transmission terminal identification signal (the TSI signal), and the training check signal (the TCF signal), the control unit 101 instructs the code decryption unit 106 to code the image data.

In the embodiment, the code decryption unit 106 codes and compresses the image data to be transmitted according to a specific code compression format, thereby generating code compression data (the PIX). Further, the code decryption unit 106 expands and decrypts the code compression data (the PIX) received according to an expansion decryption format corresponding to the code compression format attached to the code compression data (the PIX).

More specifically, when the code decryption unit 106 receives the instruction to code the image data, the code decryption unit 106 codes and compresses all of the image data stored in the temporary storage unit 103 according to the code compression format stored in the parameter memory 108, thereby generating the code compression data (the PIX). Note that the job identification information and the page number, i.e., the image identification information of the image data, are attached to the code compression data (the PIX) as is.

When the code decryption unit 106 generates the code compression data (the PIX), the control unit 101 stores the code compression data (the PIX) in the image memory 109. After the control unit 101 stores the code compression data (the PIX) in the image memory 109, the control unit 101 sends the code compression data (the PIX) to the communication unit 102. When the communication unit 102 receives the code compression data (the PIX), the communication unit 102 transmits the code compression data (the PIX) to the VoIP adaptor 10.

When the VoIP adaptor 10 receives the code compression data (the PIX), the VoIP adaptor 10 transmits the code compression data (the PIX) to the destination side facsimile device 300 when the reception side facsimile device is the destination side facsimile device 300 connected to the facsimile device 100 through the analog public telephone network 1.

When the reception side facsimile device is the destination side facsimile device 200 connected to the facsimile device 100 through the IP network 2, the VoIP adaptor 10 divides the code compression data (the PIX) into the packets having the standard size set in the parameter memory 108 in advance, and sends the packets thus divided to the destination side facsimile device 200. Each of the packets contains packet order information indicating a packet order and the image identification information of the image data.

Then, the VoIP adaptor 20 connected to the destination side facsimile device 200 assembles the packets thus divided into the code compression data (the PIX) according to the packet order information and the image identification information of the image data. When the facsimile device 100 recognizes that the destination side facsimile device 200 is connected thereto through the IP network 2, the facsimile device 100 sets the communication speed of the destination side facsimile device 200 at the communication speed of the V.17 modem. Accordingly, it is possible to smoothly transmit the packets to the destination side facsimile device 200 without discard or delay.

After the control unit 101 completely transmits all of the code compression data (the PIX) to the communication unit 102, the control unit 101 generates the sequence termination signal (the EOP signal) indicating that the code compression data (the PIX) are completely transmitted, and sends the sequence termination signal (the EOP signal) to the communication unit 102. When the communication unit 102 receives the sequence termination signal (the EOP signal), the communication unit 102 sends the sequence termination signal (the EOP signal) to the VoIP adaptor 10. When the VoIP adaptor 10 receives the sequence termination signal (the EOP signal), the VoIP adaptor 10 sends the sequence termination signal (the EOP signal) to the destination side facsimile device 200 through the IP network 2.

When the communication unit 102 receives the message confirmation (the MCF signal) as the response to the code compression data (the PIX) and the sequence termination signal (the EOP signal), the control unit 101 generates the disconnection command (the DCN signal) for disconnecting the communication line established between the facsimile device 100 and the destination side facsimile device 200, and sends the disconnection command (the DCN signal) to the communication unit 102.

When the communication unit 102 receives the disconnection command (the DCN signal), the communication unit 102 sends the disconnection command (the DCN signal) to the destination side facsimile device 200 through the VoIP adaptor 10. Accordingly, the communication line established between the facsimile device 100 and the destination side facsimile device 200 is disconnected.

When the communication unit 102 does not receive the message confirmation (the MCF signal) from the destination side facsimile device 200 within a specific period of time, the control unit 101 recognizes that the control unit 101 fails in transmitting the code compression data (the PIX) and the sequence termination signal (the EOP signal). Accordingly, in order to start the process of sending the digital command signal (the DCS signal) to the destination side facsimile device 200 one more time, the control unit 101 instructs the communication protocol changing unit 110 to determine the communication protocol. Note that the communication protocol monitoring unit 1023 of the communication unit 102 monitors and detects the communication error described above, and the communication error is stored in the communication record storage area 1072 of the system memory 107.

An operation of the facsimile device 100 as the reception side facsimile device will be explained next. First, when the communication unit 102 receives the call signal (the CNG signal) from the transmission side facsimile device, the control unit 101 sends the deformation response tone (the ANSam signal) to the communication unit 102. When the communication unit 102 receives the deformation response tone (the ANSam signal), the communication unit 102 sends the deformation response tone (the ANSam signal) to the transmission side facsimile device through the VoIP adaptor 10.

When the communication unit 102 receives the called menu (the CM signal) from the transmission side facsimile device as the response to the deformation response tone (the ANSam signal), the control unit 101 sends the common menu (the JM signal) indicating that the facsimile device 100 is the facsimile device to the communication unit 102.

After the control unit 101 sends the common menu (the JM signal) to the communication unit 102, the control unit 101 instructs the communication protocol changing unit 110 to determine whether the communication protocol is changed. When the communication protocol changing unit 110 changes the communication speed limit value of the facsimile device 100 to the communication speed of the V.17 modem, the communication unit 102 sets the modem speed to that of the V.17 modem. When the communication protocol changing unit 110 does not change the communication speed limit value of the facsimile device 100, the communication unit 102 sets the modem speed to that of the V.34 modem.

After the communication unit 102 sets the modem speed, the control unit 101 generates the digital identification signal (the DIS signal) for notifying the transmission side facsimile device of the communication speed of the V.17 modem or the V.34 modem; and the reception capability of the facsimile device 100 including the size, the line density, and the code compression format of the imaged data set in the parameter memory 108 that the VoIP adaptor 10 is capable of receiving. Then, the control unit 101 sends the digital identification signal (the DIS signal) to the communication unit 102.

After the control unit 101 sends the digital identification signal (the DIS signal) to the communication unit 102, the control unit 101 generates the called terminal identification signal (the CSI signal) including the identification information of the facsimile device 100 set in the parameter memory 108, and sends the called terminal identification signal (the CSI signal) to the communication unit 102.

When the communication unit 102 receives the digital identification signal (the DIS signal) and the called terminal identification signal (the CSI signal), the communication unit 102 sequentially sends the digital identification signal (the DIS signal) and the called terminal identification signal (the CSI signal) to the transmission side facsimile device through the VoIP adaptor 10.

Afterward, when the communication unit 102 receives the digital command signal (the DCS signal), the transmission terminal identification signal (the TSI signal), and the training check signal (the TCF signal) from the transmission side facsimile device as the response to the digital identification signal (the DIS signal) and the called terminal identification signal (the CSI signal), the control unit 101 generates the reception ready confirmation signal (the CFR signal) indicating that the facsimile device 100 is ready for reception, and sends the reception ready confirmation signal (the CFR signal) to the communication unit 102.

When the communication unit 102 receives the reception ready confirmation signal (the CFR signal), the communication unit 102 sends the reception ready confirmation signal (the CFR signal) to the transmission side facsimile device through the VoIP adaptor 10.

After the communication unit 102 sends the reception ready confirmation signal (the CFR signal), when the VoIP adaptor 10 receives the code compression data (the PIX) and the sequence termination signal (the EOP signal) from the destination side facsimile device 300 as the transmission side facsimile device connected to the facsimile device 100 through the analog public telephone network 1, the VoIP adaptor 10 sends the code compression data (the PIX) and the sequence termination signal (the EOP signal) to the communication unit 102 of the facsimile device 100.

On the other hand, when the VoIP adaptor 10 receives the packets of the code compression data (the PIX) and the sequence termination signal (the EOP signal) from the destination side facsimile device 200 as the transmission side facsimile device connected to the facsimile device 100 through the IP network 2, the VoIP adaptor 10 assembles the packets to the code compression data (the PIX). Then, the VoIP adaptor 10 sends the code compression data (the PIX) and the sequence termination signal (the EOP signal) to the communication unit 102 of the facsimile device 100.

In the embodiment, when the facsimile device 100 recognizes that the facsimile device 100 is connected to the destination side facsimile device 200 through the IP network 2, the facsimile device 100 sets the communication speed thereof to the communication speed of the modem V.17. Accordingly, it is possible to smoothly send the packets to the facsimile device 100 without discard or delay.

When the communication unit 102 receives the code compression data (the PIX) and the sequence termination signal (the EOP signal) from the transmission side facsimile device, the control unit 101 stores the code compression data (the PIX) in the temporary storage unit 103. After the control unit 101 stores all of the code compression data (the PIX) in the temporary storage unit 103, the control unit 101 instructs the code decryption unit 106 to restore the code compression data (the PIX). Note that the code compression format is attached to the code compression data (the PIX).

When the communication unit 102 does not receive the code compression data (the PIX) and the sequence termination signal (the EOP signal) from the transmission side facsimile device within a specific period of time, the control unit 101 recognizes that the control unit 101 fails in receiving the code compression data (the PIX) and the sequence termination signal (the EOP signal). Accordingly, in order to start the process of sending the digital identification signal (the DIS signal) to the transmission side facsimile device one more time, the control unit 101 instructs the communication protocol changing unit 110 to determine the communication protocol. Note that the communication protocol monitoring unit 1023 of the communication unit 102 monitors and detects the communication error described above, and the communication error is stored in the communication record storage area 1072 of the system memory 107.

When the control unit 101 instructs the code decryption unit 106 to restore the code compression data (the PIX), the code decryption unit 106 restores all of the code compression data (the PIX) stored in the temporary storage unit 103 according to the expansion decryption format corresponding to the code compression format attached to the code compression data (the PIX).

After the code decryption unit 106 restores the image data, the control unit 101 stores the image data thus restored in the temporary storage unit 103. After the control unit 101 stores the image data, the control unit 101 sends the message confirmation (the MCF signal) to the communication unit 102, and instructs the printing unit 111 to perform the printing operation of the image data.

When the communication unit 102 receives the message confirmation (the MCF signal), the communication unit 102 sends the message confirmation (the MCF signal) to the transmission side facsimile device through the VoIP adaptor 10.

In the embodiment, the printing unit 111 performs the printing operation of the image data thus restored and generated from the code compression data (the PIX) received from the transmission side facsimile device. More specifically, when the control unit 101 instructs the printing unit 111 to perform the printing operation of the image data, the printing unit 111 performs the printing operation using a print medium held with a medium holding portion (not shown) according to the image data stored in the temporary storage unit 103.

After the printing unit 111 completes the printing operation, the printing unit 111 generates a printing operation completion signal, and sends the printing operation completion signal to the control unit 101. When the communication unit 102 receives the disconnection command (the DCN signal) as the response to the message confirmation (the MCF signal), the communication line between the facsimile device 100 and the transmission side facsimile device is disconnected.

Figure 5:
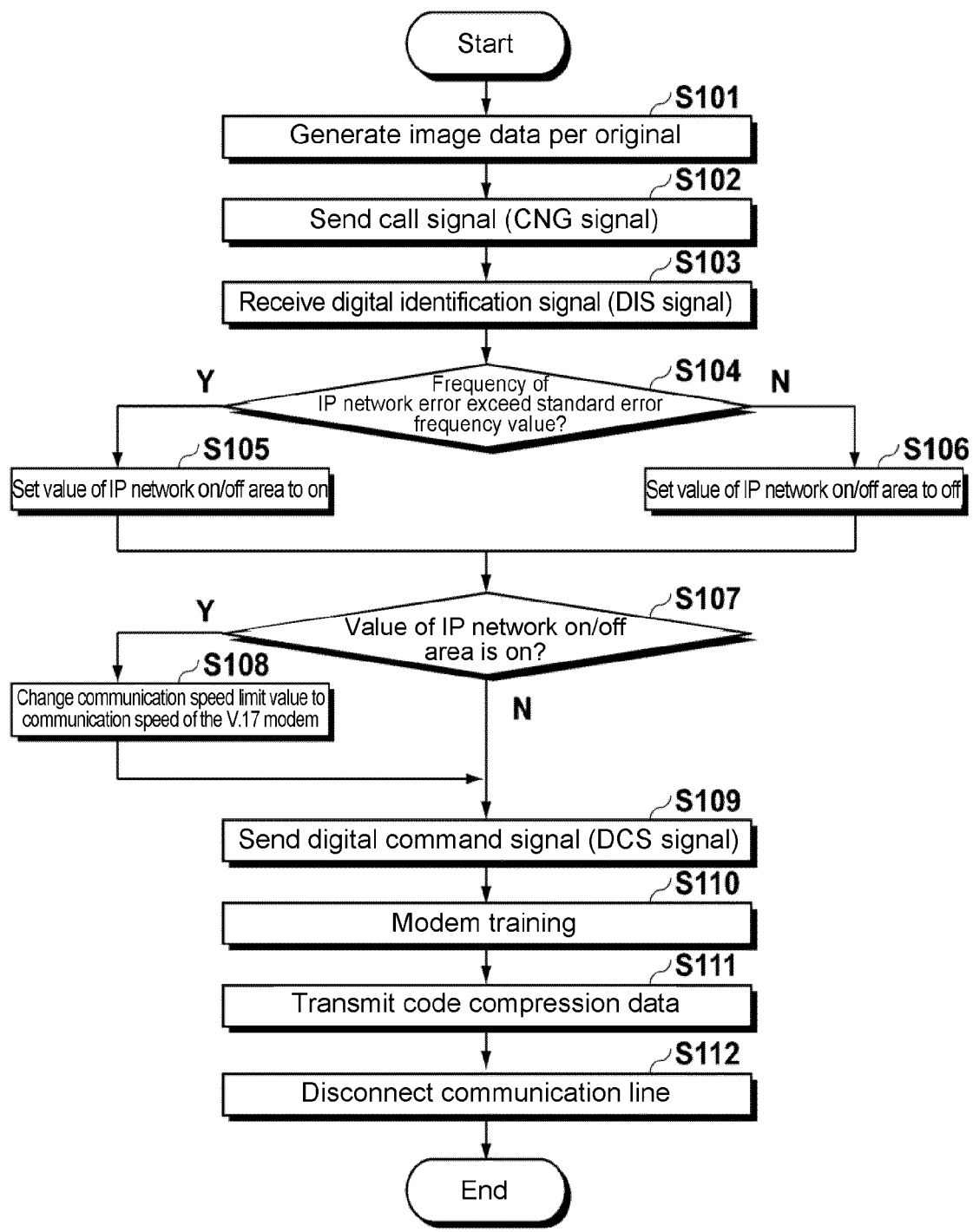
FIG. 5 is a flow chart showing a transmission operation of the facsimile device according to the first embodiment of the present invention.

An operation of the facsimile device 100 will be explained with reference to flow charts. First, the transmission operation of the facsimile device 100 as the transmission side facsimile device will be explained with reference to FIG. 5. FIG. 5 is a flow chart showing the transmission operation of the facsimile device 100 according to the first embodiment of the present invention.

First, the operator places an original on the manual tray (not shown) of the facsimile device 100, and pushes the start button of the input display unit 104, thereby instructing the facsimile communication. When the start button is pushed, the control unit 101 instructs the image reading unit 105 to read an image on the original. Before the operator pushes the start button, the operator operates the buttons and the touch panel of the input display unit 104 to set the fax number of the destination side facsimile device 200 as the reception side facsimile device and the various setting values such as the image resolution. The control unit 101 controls to store the setting values in the temporary storage unit 103.

In step S101, when the control unit 101 instructs the image reading unit 105 to read the image on the original, the image reading unit 105 optically reads the original on the original stage (not shown) transported from the manual tray (not shown), thereby generating the image data per original.

In the embodiment, every time when the image reading unit 105 generates the image data, the control unit 101 stores the image data in the image memory 109. When the control unit 101 stores the image data, the control unit 101 generates the call signal (the CNG signal) for calling the reception side facsimile device, and sends the call signal to the communication unit 102. The fax number of the reception side facsimile device stored in the temporary storage unit 103 and the fax number of the facsimile device 100 stored in the parameter memory 108 are automatically added to the call signal (the CNG signal).

When the communication protocol monitoring unit 1023 detects the communication error in transmission or reception of the various sequence signals or the code compression data (the PIX) during the facsimile communication according to the communication sequence of the ITU-T standard T.30, the communication protocol monitoring unit 1023 searches an error number corresponding to the communication error from the communication error table 10231. Then, the communication protocol monitoring unit 1023 generates the error detection signal with the error number attached thereto, and sends the error detection signal to the control unit 101.

When the control unit 101 receives the error detection signal, the control unit 101 stores the error number indicated in the error detection signal in the communication record storage area 1072 of the system memory 107.

In step S102, when the communication unit 102 receives the call signal (the CNG signal) from the control unit 101, the communication unit 102 sends the call signal (the CNG signal) to the fax number of the reception side facsimile device through the VoIP adaptor 10.

In step S103, after the communication unit 102 receives the common menu (the JM signal) from the reception side facsimile device, the communication unit 102 receives the digital identification signal (the DIS signal) and the called terminal identification signal (the CSI signal) from the reception side facsimile device. Then, the control unit 101 stores the reception capability of the reception side facsimile device attached to the digital identification signal (the DIS signal) and the identification information of the reception side facsimile device attached to the called terminal identification signal (the CSI signal) in the temporary storage unit 103. After the control unit 101 stores the reception capability and the identification information of the reception side facsimile device, the control unit 101 instructs the communication protocol changing unit 110 to determine whether the communication protocol is changed.

In the embodiment, when the control unit 101 instructs the communication protocol changing unit 110 to determine whether the communication protocol is changed, the communication protocol changing unit 110 instructs the IP network error detection unit 1101 to detect the IP network error. When the communication protocol changing unit 110 instructs the IP network error detection unit 1101 to detect the IP network error, the IP network error detection unit 1101 searches the error numbers of the communication errors and the total number thereof stored in 1072 of the system memory 107. Then, the control unit 1011 detects the IP network error number indicating the total number of the communication error corresponding to the error number of the IP network error stored in the IP network error table 11011.

In the embodiment, the IP network error number detected with the IP network error detection unit 1101 is stored in the IP network error total number area 1074 of the system memory 107 through the control unit 101. When the IP network error number detected with the IP network error detection unit 1101 is stored in the IP network error total number area 1074 of the system memory 107, the communication protocol changing unit 110 instructs the error frequency calculation unit 1102 to calculate the IP network error frequency.

In the embodiment, when the communication protocol changing unit 110 instructs the error frequency calculation unit 1102 to calculate the IP network error frequency, the error frequency calculation unit 1102 divides the total number of the IP network error stored in the IP network error total number area 1074 of the system memory 107 by a total communication number stored in the total communication number area 1073 of the system memory 107, thereby calculating the frequency of the IP network error. After the error frequency calculation unit 1102 calculates the frequency of the IP network error, the temporary storage unit 103 stores the frequency of the IP network error through the control unit 101.

After the error frequency calculation unit 1102 calculates the frequency of the IP network error, the communication protocol changing unit 110 instructs the IP network determining unit 1103 to determine the IP network. In step S104, when the communication protocol changing unit 110 instructs the IP network determining unit 1103 to determine the IP network, the temporary storage unit 103 determines whether the frequency of the IP network error stored in the IP network determining unit 1103 exceeds the standard error frequency value stored in the parameter memory 108.

When the IP network determining unit 1103 determines that the frequency of the IP network error stored in the temporary storage unit 103 exceeds the standard error frequency value stored in the parameter memory 108, the IP network determining unit 1103 determines that the facsimile device 100 is connected to the reception side facsimile device through the IP network 2. Accordingly, the IP network determining unit 1103 generates the IP network connection on signal, and sends the IP network connection on signal to the control unit 101.

When the IP network determining unit 1103 determines that the frequency of the IP network error stored in the temporary storage unit 103 is smaller than the standard error frequency value stored in the parameter memory 108, the IP network determining unit 1103 determines that the facsimile device 100 is not connected to the reception side facsimile device through the IP network 2. Accordingly, the IP network determining unit 1103 generates the IP network connection off signal, and sends the IP network connection off signal to the control unit 101.

In step S105, when the control unit 101 receives the IP network connection on signal, the control unit 101 set the value of the IP network on/off area 1071 of the system memory 107 to on. In step S106, when the control unit 101 receives the IP network connection off signal, the control unit 101 set the value of the IP network on/off area 1071 of the system memory 107 to off.

When the control unit 101 set the value of the IP network on/off area 1071 of the system memory 107 to on or off according to the determination result of the IP network determining unit 1103, the communication protocol changing unit 110 instructs the communication speed limit value changing unit 1104 to determine whether the communication speed limit value is changed. When the communication protocol changing unit 110 instructs the communication speed limit value changing unit 1104 to determine whether the communication speed limit value is changed, the communication speed limit value changing unit 1104 searches the IP network on/off area 1071 of the system memory 107.

In step S107, when the value of the IP network on/off area 1071 of the system memory 107 is set to on, the communication speed limit value changing unit 1104 changes the communication speed limit value of the facsimile device 100 to the communication speed of the V.17 modem (14.8 kbps) in step S108. On the other hand, when the value of the IP network on/off area 1071 of the system memory 107 is set to off, the communication speed limit value changing unit 1104 maintains the communication speed limit value of the facsimile device 100 at the communication speed of the V.34 modem (36.6 kbps).

When the communication speed limit value changing unit 1104 changes the communication speed limit value of the facsimile device 100 to the communication speed of the V.17 modem, the communication unit 102 set the modem speed of the facsimile device 100 to the communication speed of the V.17 modem. On the other hand, when the communication speed limit value changing unit 1104 does not change the communication speed limit value, the communication unit 102 set a modem speed capable of communicating between the facsimile device 100 and the reception side facsimile device according to the communication speed of the V.34 modem stored in the parameter memory 108 and the reception capability of the reception side facsimile device stored in the temporary storage unit 103.

In step S109, when the communication unit 102 sets the modem speed, the control unit 101 generates the digital command signal (the DCS signal) to notify the communication conditions to the reception side facsimile device, and sends the digital command signal (the DCS signal) to the communication unit 102. The communication conditions include the modem speed thus set; the device capabilities of the facsimile device 100 and the reception side facsimile device; the size, the line density, and the code compression format of the image data; and the likes.

After the control unit 101 sends the digital command signal (the DCS signal) to the communication unit 102, the control unit 101 generates the transmission terminal identification signal (the TSI signal), and sends the transmission terminal identification signal (the TSI signal) to the communication unit 102.

In step S110, after the control unit 101 sends the transmission terminal identification signal (the TSI signal) to the communication unit 102, the control unit 101 generates the training check signal (the TCF signal) for conducting the modem training at the communication speed of the facsimile communication between the facsimile device 100 and the reception side facsimile device, and sends the training check signal (the TCF signal) to the communication unit 102.

When the communication unit 102 receives the digital command signal (the DCS signal), the transmission terminal identification signal (the TSI signal), and the training check signal (the TCF signal), the communication unit 102 sequentially sends the digital command signal (the DCS signal), the transmission terminal identification signal (the TSI signal), and the training check signal (the TCF signal) to the reception side facsimile device through the VoIP adaptor 10.

When the communication unit 102 receives the reception ready confirmation signal (the CFR signal) from the reception side facsimile device in response to the digital command signal (the DCS signal), the transmission terminal identification signal (the TSI signal), and the training check signal (the TCF signal), the control unit 101 instructs the code decryption unit 106 to code the image data.

When the code decryption unit 106 receives the instruction to code the image data, the code decryption unit 106 codes and compresses all of the image data stored in the temporary storage unit 103 according to the code compression format stored in the parameter memory 108, thereby generating the code compression data (the PIX).

When the code decryption unit 106 generates the code compression data (the PIX), the control unit 101 stores the code compression data (the PIX) in the image memory 109. After the control unit 101 stores the code compression data (the PIX) in the image memory 109, the control unit 101 sends the code compression data (the PIX) to the communication unit 102. In step S111, when the communication unit 102 receives the code compression data (the PIX), the communication unit 102 transmits the code compression data (the PIX) to the VoIP adaptor 10.

When the VoIP adaptor 10 receives the code compression data (the PIX), the VoIP adaptor 10 transmits the code compression data (the PIX) to the destination side facsimile device 300 when the reception side facsimile device is the destination side facsimile device 300 connected to the facsimile device 100 through the analog public telephone network 1.

When the reception side facsimile device is the destination side facsimile device 200 connected to the facsimile device 100 through the IP network 2, the VoIP adaptor 10 divides the code compression data (the PIX) into the packets having the standard size set in the parameter memory 108 in advance, and sends the packets thus divided to the destination side facsimile device 200. Each of the packets contains the packet order information indicating the packet order and the image identification information of the image data.

Then, the VoIP adaptor 20 connected to the destination side facsimile device 200 assembles the packets thus divided into the code compression data (the PIX) according to the packet order information and the image identification information of the image data. When the facsimile device 100 recognizes that the destination side facsimile device 200 is connected thereto through the IP network 2, the facsimile device 100 sets the communication speed of the destination side facsimile device 200 at the communication speed of the V.17 modem. Accordingly, it is possible to smoothly transmit the packets to the destination side facsimile device 200 without discard or delay.

After the control unit 101 completely transmits all of the code compression data (the PIX) to the communication unit 102, the control unit 101 generates the sequence termination signal (the EOP signal) indicating that the code compression data (the PIX) are completely transmitted, and sends the sequence termination signal (the EOP signal) to the communication unit 102. When the communication unit 102 receives the sequence termination signal (the EOP signal), the communication unit 102 sends the sequence termination signal (the EOP signal) to the VoIP adaptor 10. When the VoIP adaptor 10 receives the sequence termination signal (the EOP signal), the VoIP adaptor 10 sends the sequence termination signal (the EOP signal) to the destination side facsimile device 200 through the IP network 2.

When the communication unit 102 receives the message confirmation (the MCF signal) as the response to the code compression data (the PIX) and the sequence termination signal (the EOP signal), the control unit 101 generates the disconnection command (the DCN signal) for disconnecting the communication line established between the facsimile device 100 and the destination side facsimile device 200, and sends the disconnection command (the DCN signal) to the communication unit 102.

In step S112, when the communication unit 102 receives the disconnection command (the DCN signal), the communication unit 102 sends the disconnection command (the DCN signal) to the destination side facsimile device 200 through the VoIP adaptor 10. Accordingly, the communication line established between the facsimile device 100 and the destination side facsimile device 200 is disconnected.

When the communication unit 102 does not receive the message confirmation (the MCF signal) from the destination side facsimile device 200 within a specific period of time, the control unit 101 recognizes that the control unit 101 fails in transmitting the code compression data (the PIX) and the sequence termination signal (the EOP signal). Accordingly, in order to start the process of sending the digital command signal (the DCS signal) to the destination side facsimile device 200 one more time, the control unit 101 instructs the communication protocol changing unit 110 to determine the communication protocol. Note that the communication protocol monitoring unit 1023 of the communication unit 102 monitors and detects the communication error described above, and the communication error is stored in the communication record storage area 1072 of the system memory 107.

Figure 6:
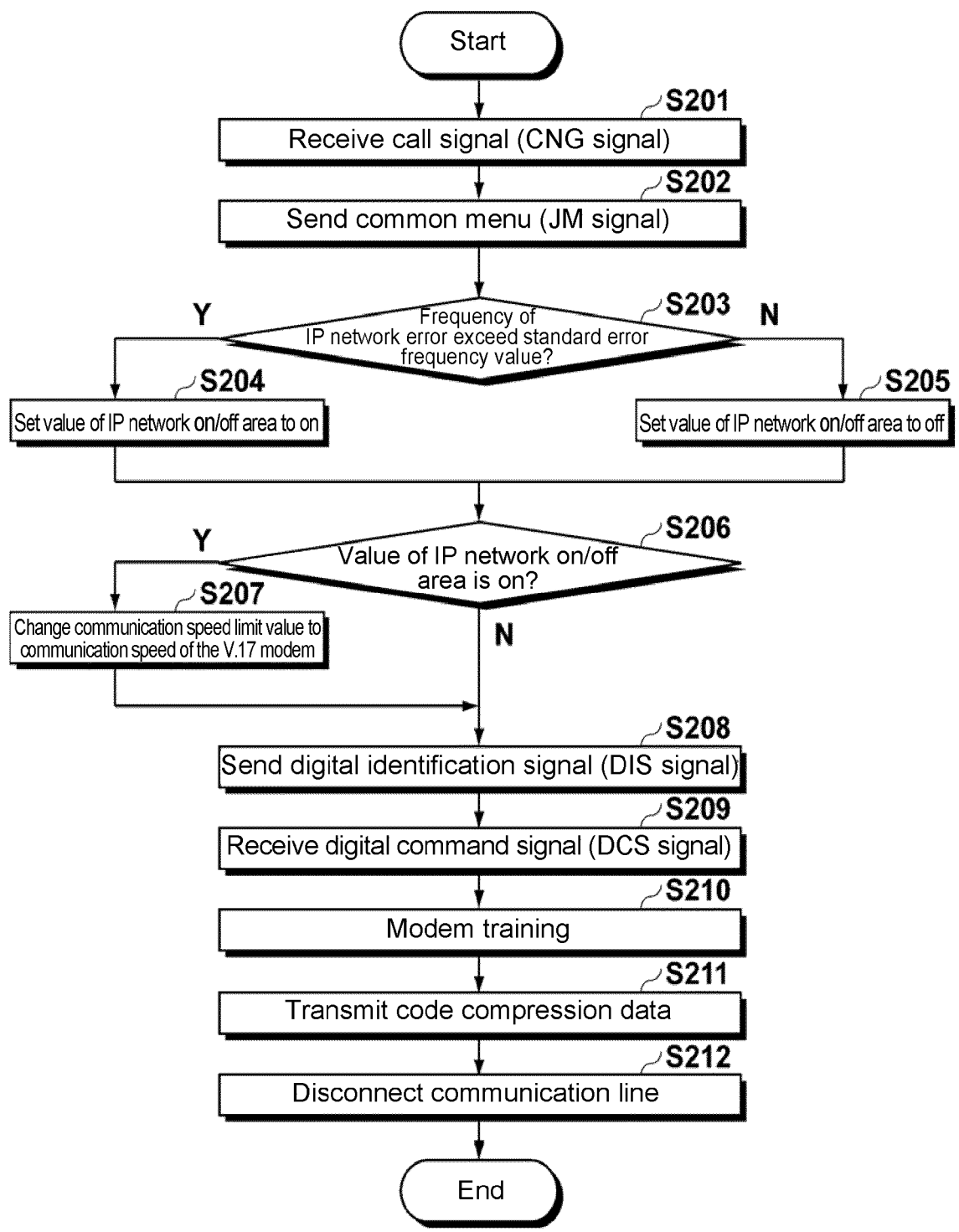
FIG. 6 is a flow chart showing a reception operation of the facsimile device according to the first embodiment of the present invention.

The reception operation of the facsimile device 100 as the reception side facsimile device will be explained with reference to FIG. 6. FIG. 6 is a flow chart showing the reception operation of the facsimile device 100 according to the first embodiment of the present invention.

In step S201, when the communication unit 102 receives the call signal (the CNG signal) from the destination side facsimile device 200, the control unit 101 sends the deformation response tone (the ANSam signal) to the communication unit 102. When the communication unit 102 receives the deformation response tone (the ANSam signal), the communication unit 102 sends the deformation response tone (the ANSam signal) to the destination side facsimile device 200 through the VoIP adaptor 10.

In step S202, when the communication unit 102 receives the called menu (the CM signal) from the destination side facsimile device 200 as the response to the deformation response tone (the ANSam signal), the control unit 101 sends the common menu (the JM signal) indicating that the facsimile device 100 is the facsimile device to the communication unit 102.

After the control unit 101 sends the common menu (the JM signal) to the communication unit 102, the control unit 101 instructs the communication protocol changing unit 110 to determine whether the communication protocol is changed. A process from step S203 to step S207 is similar to the process from step S104 to step S108.

When the communication protocol changing unit 110 changes the communication speed limit value of the facsimile device 100 to the communication speed of the V.17 modem, the communication unit 102 sets the modem speed to that of the V.17 modem. When the communication protocol changing unit 110 does not change the communication speed limit value of the facsimile device 100, the communication unit 102 sets the modem speed to that of the V.34 modem.

After the communication unit 102 sets the modem speed, the control unit 101 generates the digital identification signal (the DIS signal) for notifying the transmission side facsimile device of the communication speed of the V.17 modem or the V.34 modem; and the reception capability of the facsimile device 100 including the size, the line density, and the code compression format of the imaged data set in the parameter memory 108 that the VoIP adaptor 10 is capable of receiving. Then, the control unit 101 sends the digital identification signal (the DIS signal) to the communication unit 102.

After the control unit 101 sends the digital identification signal (the DIS signal) to the communication unit 102, the control unit 101 generates the called terminal identification signal (the CSI signal) including the identification information of the facsimile device 100 set in the parameter memory 108, and sends the called terminal identification signal (the CSI signal) to the communication unit 102.

In step S208, when the communication unit 102 receives the digital identification signal (the DIS signal) and the called terminal identification signal (the CSI signal), the communication unit 102 sequentially sends the digital identification signal (the DIS signal) and the called terminal identification signal (the CSI signal) to the transmission side facsimile device through the VoIP adaptor 10.

In step S209, when the communication unit 102 receives the digital command signal (the DCS signal), the transmission terminal identification signal (the TSI signal), and the training check signal (the TCF signal) from the transmission side facsimile device as the response to the digital identification signal (the DIS signal) and the called terminal identification signal (the CSI signal), the control unit 101 generates the reception ready confirmation signal (the CFR signal) indicating that the facsimile device 100 is ready for reception, and sends the reception ready confirmation signal (the CFR signal) to the communication unit 102.

In step S210, when the communication unit 102 receives the reception ready confirmation signal (the CFR signal), the communication unit 102 sends the reception ready confirmation signal (the CFR signal) to the transmission side facsimile device through the VoIP adaptor 10.

After the communication unit 102 sends the reception ready confirmation signal (the CFR signal), when the VoIP adaptor 10 receives the code compression data (the PIX) and the sequence termination signal (the EOP signal) from the destination side facsimile device 300 as the transmission side facsimile device connected to the facsimile device 100 through the analog public telephone network 1, the VoIP adaptor 10 sends the code compression data (the PIX) and the sequence termination signal (the EOP signal) to the communication unit 102 of the facsimile device 100.

On the other hand, when the VoIP adaptor 10 receives the packets of the code compression data (the PIX) and the sequence termination signal (the EOP signal) from the destination side facsimile device 200 as the transmission side facsimile device connected to the facsimile device 100 through the IP network 2, the VoIP adaptor 10 assembles the packets to the code compression data (the PIX). Then, the VoIP adaptor 10 sends the code compression data (the PIX) and the sequence termination signal (the EOP signal) to the communication unit 102 of the facsimile device 100.

In the embodiment, when the facsimile device 100 recognizes that the facsimile device 100 is connected to the destination side facsimile device 200 through the IP network 2, the facsimile device 100 sets the communication speed thereof to the communication speed of the modem V.17. Accordingly, it is possible to smoothly send the packets to the facsimile device 100 without discard or delay.

When the communication unit 102 receives the code compression data (the PIX) and the sequence termination signal (the EOP signal) from the transmission side facsimile device, the control unit 101 stores the code compression data (the PIX) in the temporary storage unit 103. After the control unit 101 stores all of the code compression data (the PIX) in the temporary storage unit 103, the control unit 101 instructs the code decryption unit 106 to decrypt the code compression data (the PIX). Note that the code compression format is attached to the code compression data (the PIX).

When the communication unit 102 does not receive the code compression data (the PIX) and the sequence termination signal (the EOP signal) from the transmission side facsimile device within a specific period of time, the control unit 101 recognizes that the control unit 101 fails in receiving the code compression data (the PIX) and the sequence termination signal (the EOP signal). Accordingly, in order to start the process of sending the digital identification signal (the DIS signal) to the transmission side facsimile device one more time, the control unit 101 instructs the communication protocol changing unit 110 to detect the IP network error. Note that the communication protocol monitoring unit 1023 of the communication unit 102 monitors and detects the communication error described above, and the communication error is stored in the communication record storage area 1072 of the system memory 107.

When the control unit 101 instructs the code decryption unit 106 to decrypt the code compression data (the PIX), the code decryption unit 106 expands and decrypts all of the code compression data (the PIX) stored in the temporary storage unit 103 according to the expansion decryption format corresponding to the code compression format attached to the code compression data (the PIX).

After the code decryption unit 106 restores the image data, the control unit 101 stores the image data thus restored in the temporary storage unit 103. After the control unit 101 stores the image data, the control unit 101 sends the message confirmation (the MCF signal) to the communication unit 102, and instructs the printing unit 111 to perform the printing operation of the image data.

When the communication unit 102 receives the message confirmation (the MCF signal), the communication unit 102 sends the message confirmation (the MCF signal) to the transmission side facsimile device through the VoIP adaptor 10.

When the control unit 101 instructs the printing unit 111 to perform the printing operation of the image data, the printing unit 111 performs the printing operation using a print medium held with a medium holding portion (not shown) according to the image data stored in the temporary storage unit 103. After the printing unit 111 completes the printing operation, the printing unit 111 generates the printing operation completion signal, and sends the printing operation completion signal to the control unit 101.

In step S212, when the communication unit 102 receives the disconnection command (the DCN signal) as the response to the message confirmation (the MCF signal), the communication line between the facsimile device 100 and the transmission side facsimile device is disconnected.

As described above, in the embodiment, it is determined whether the frequency of the IP network error presumed to occur in the IP network 2 among the communication error stored in the system memory 107 of the system memory 107 is greater than the standard error frequency value relative to the total communication number, so that it is determined whether the facsimile device 100 is connected to the destination side facsimile device 200 through the IP network 2. When it is determined that the facsimile device 100 is connected to the destination side facsimile device 200 through the IP network 2, the device capacity is set to the communication speed of the V.17 modem. Accordingly, it is possible to reduce discard or delay of the packets in the IP network 2, thereby making it possible to smoothly send and receive the image data between the facsimile device 100 and the reception side facsimile device or the transmission side facsimile device.

Second Embodiment

A second embodiment of the present invention will be explained next. Components in the second embodiment similar to those in the first embodiment are designated with the same reference numerals, and explanations thereof are omitted. The components similar to those in the first embodiment provide similar effects, and explanations thereof are omitted.

Figure 7:
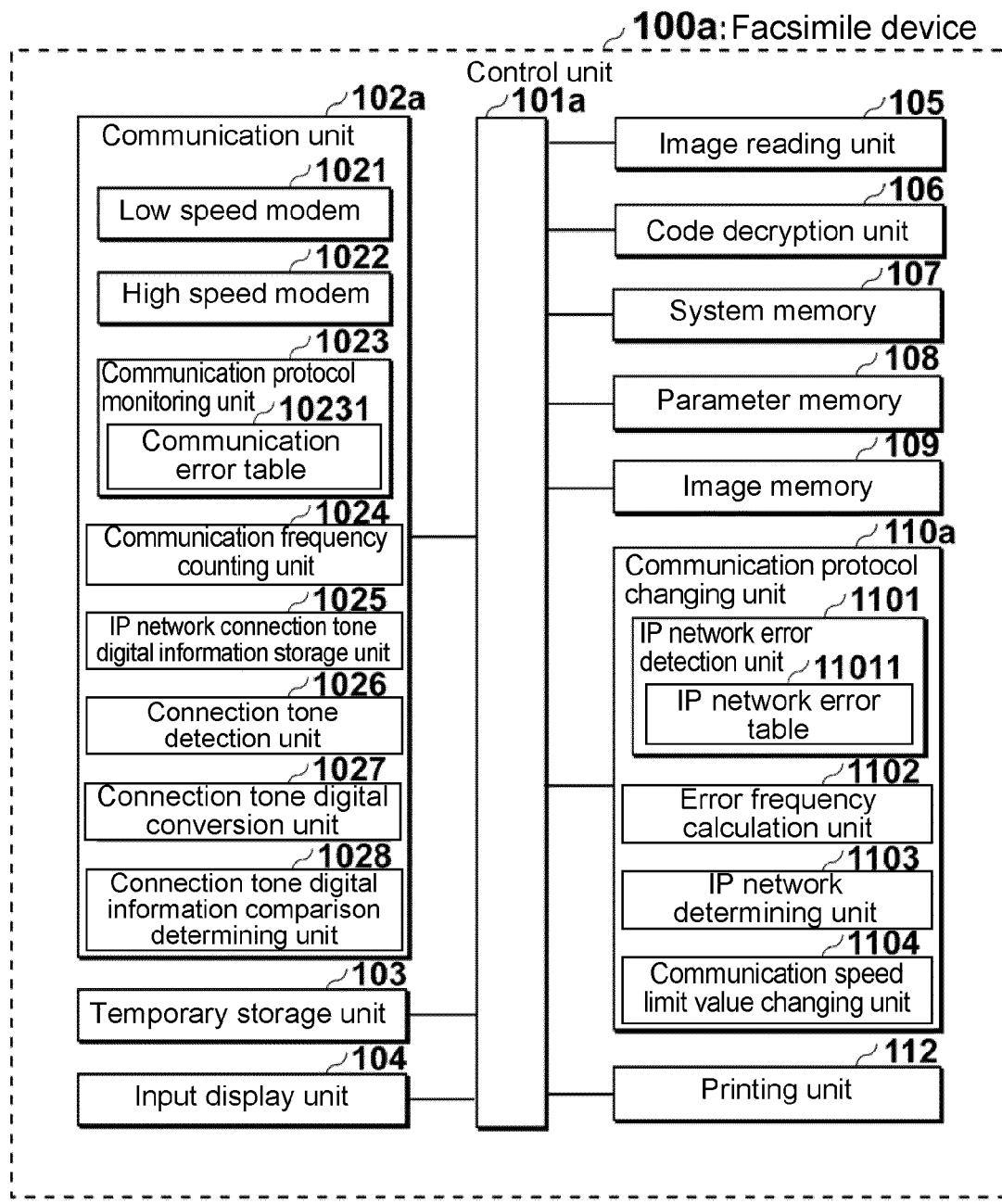
FIG. 7 is a schematic block diagram showing a configuration of a facsimile device according to a second embodiment of the present invention.

FIG. 7 is a schematic block diagram showing a configuration of a facsimile device 100a according to the second embodiment of the present invention.

As shown in FIG. 7, the facsimile device 100a includes a communication unit 102a. The communication unit 102a includes an IP network connection tone digital information storage unit 1025; a connection tone detection unit 1026; a connection tone digital conversion unit 1027; and a connection tone digital information comparison determining unit 1028 (a determining unit).

When the facsimile device 100a as the transmission side facsimile device is connected to a facsimile device through the VoIP adaptor 10, the VoIP adaptor 10 generates a connection tone in a case that the facsimile device 100a is connected through the analog public telephone network 1 different from that in a case that the facsimile device 100a is connected through the IP network 2. Accordingly, it is possible to determine that the facsimile device 100a is connected through the analog public telephone network 1 or the IP network 2.

As shown in FIG. 7, the facsimile device 100a further includes a control unit 101a; a communication unit 102a; the temporary storage unit 103; the input display unit 104; the image reading unit 105; the code decryption unit 106; the system memory 107; the parameter memory 108; the image memory 109; a communication protocol changing unit 110a; and the printing unit 111.

As shown in FIG. 7, the communication unit 102a includes the low speed modem 1021; the high speed modem 1022; the communication protocol monitoring unit 1023; the communication frequency counting unit 1024; the IP network connection tone digital information storage unit 1025; the connection tone detection unit 1026; the connection tone digital conversion unit 1027; and the connection tone digital information comparison determining unit 1028.

In the embodiment, the IP network connection tone digital information storage unit 1025 stores IP network connection tone digital information digitally converted from a connection tone generated by the VoIP adaptor 10 when the VoIP adaptor 10 is connected through the IP network 2. The connection tone has a pattern of, for example, an intermittent tone, in which a sound having one single frequency of between 400 to 450 Hz is alternately turned on for 0.5 second and turned off for 0.5 second. A different connection tone is assigned by each manufacture of the VoIP adaptor 10.

More specifically, the IP network connection tone digital information storage unit 1025 stores the IP network connection tone digital information digitally converted from the connection tone generated by the VoIP adaptor 10 with a specific format when the VoIP adaptor 10 is connected through the IP network 2. In the facsimile device 100a, the IP network connection tone digital information storage unit 1025 stores the IP network connection tone digital information in advance at a manufacture thereof. Alternatively, it may be arranged such that the operator can register the IP network connection tone digital information through the input display unit 104.

An operation of the facsimile device 100a as the transmission side facsimile device will be explained next. First, in order to establish the communication line between the facsimile device 100a and the reception side facsimile device, the facsimile device 100a exchanges the call signal (the CNG signal) and the deformation response tone (the ANSam signal) with the reception side facsimile device. After the communication line is established between the facsimile device 100a and the reception side facsimile device, the VoIP adaptor 10 sends the connection tone to the facsimile device 100a indicating that the connection is through the analog public telephone network 1 or the IP network 2.

When the communication unit 102a detects the connection tone using a tone detection function of the connection tone detection unit 1026, the communication unit 102a instructs the connection tone digital conversion unit 1027 to digitally convert the connection tone. When the communication unit 102a instructs the connection tone digital conversion unit 1027 to digitally convert the connection tone, the connection tone digital conversion unit 1027 digitally converts the connection tone thus detected with a specific format, thereby generating connection tone digital information.

When the connection tone digital conversion unit 1027 generates the connection tone digital information, the communication unit 102a instructs the connection tone digital information comparison determining unit 1028 to compare and determine the connection tone digital information. When the communication unit 102a instructs the connection tone digital information comparison determining unit 1028 (the determining unit) to compare and determine the connection tone digital information, the connection tone digital information comparison determining unit 1028 searches the IP network connection tone digital information storage unit 1025 according to the connection tone digital information thus generated.

When the connection tone digital information comparison determining unit 1028 finds the IP network connection tone digital information corresponding to the connection tone digital information, the connection tone digital information comparison determining unit 1028 determines that the VoIP adaptor 10 is connected through the IP network 2, and generates an IP network connection signal.

On the other hand, when the connection tone digital information comparison determining unit 1028 does not find the IP network connection tone digital information corresponding to the connection tone digital information, the connection tone digital information comparison determining unit 1028 determines that the VoIP adaptor 10 is connected through the analog public telephone network 1, and generates an analog public network connection signal.

When the connection tone digital information comparison determining unit 1028 generates the IP network connection signal or the analog public network connection signal, the communication unit 102a sends the IP network connection signal or the analog public network connection signal to the control unit 101a.

When the control unit 101a receives the IP network connection signal, the control unit 101a sets the IP network on/off area 1071 of the system memory 107 to on. On the other hand, when the control unit 101a receives the analog public network connection signal, the control unit 101a sets the IP network on/off area 1071 of the system memory 107 to off.

When the control unit 101a sets the IP network on/off area 1071 of the system memory 107 to on or off, the control unit 101a instructs the communication protocol changing unit 110a to determine whether the communication protocol is changed. When the control unit 101a instructs the communication protocol changing unit 110a to determine whether the communication protocol is changed, the communication protocol changing unit 110a instructs the communication speed limit value changing unit 1104 to determine whether the communication speed limit value is changed.

Note that the rest of the operation of the facsimile device 100a as the transmission side facsimile device is similar to that of the facsimile device 100 as the transmission side facsimile device, and an explanation thereof is omitted. Further, the operation of the facsimile device 100a as the reception side facsimile device is similar to that of the facsimile device 100 as the reception side facsimile device, and an explanation thereof is omitted.

Figure 8:
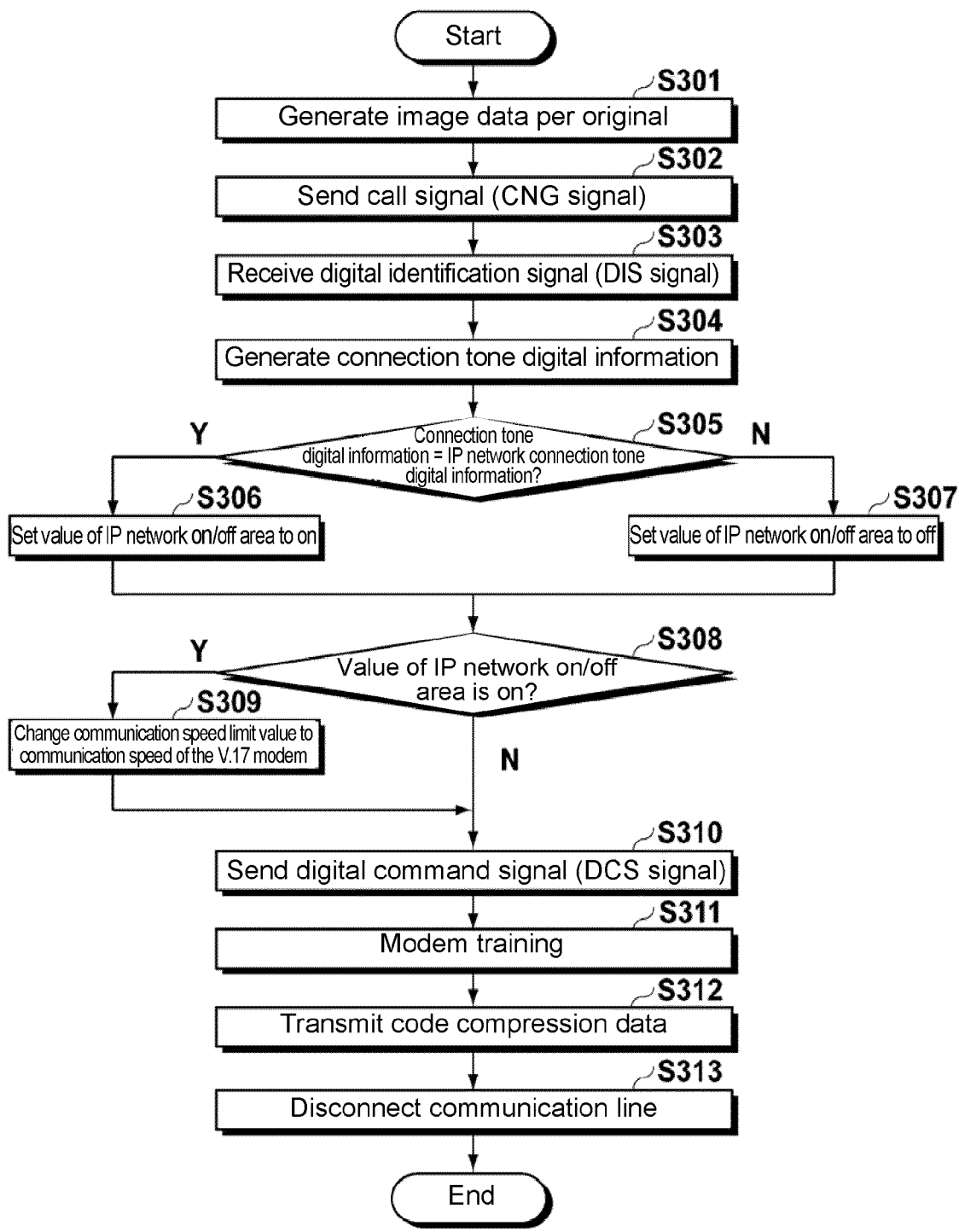
FIG. 8 is a flow chart showing a transmission operation of the facsimile device according to the second embodiment of the present invention.

An operation of the facsimile device 100a will be explained with reference to a flow chart. First, the transmission operation of the facsimile device 100a as the transmission side facsimile device will be explained with reference to FIG. 8. FIG. 8 is a flow chart showing the transmission operation of the facsimile device 100a according to the second embodiment of the present invention.

Note that a process of the facsimile device 100a from step S301 to S302 is similar to the process of the facsimile device 100 from step S101 to S102, and an explanation thereof is omitted.

In order to establish the communication line between the facsimile device 100a and the reception side facsimile device, the facsimile device 100a exchanges the call signal (the CNG signal) and the deformation response tone (the ANSam signal) with the reception side facsimile device. After the communication line between the facsimile device 100a and the reception side facsimile device is established, the VoIP adaptor 10 sends the connection tone to the facsimile device 100a indicating that the connection is through the analog public telephone network 1 or the IP network 2.

In step S303, when the communication unit 102a detects the connection tone using the tone detection function of the connection tone detection unit 1026, the communication unit 102a instructs the connection tone digital conversion unit 1027 to digitally convert the connection tone. In step S304, when the communication unit 102a instructs the connection tone digital conversion unit 1027 to digitally convert the connection tone, the connection tone digital conversion unit 1027 digitally converts the connection tone thus detected with a specific format, thereby generating the connection tone digital information. When the connection tone digital conversion unit 1027 generates the connection tone digital information, the communication unit 102a instructs the connection tone digital information comparison determining unit 1028 to compare and determine the connection tone digital information.

In step S305, when the communication unit 102a instructs the connection tone digital information comparison determining unit 1028 (the determining unit) to compare and determine the connection tone digital information, the connection tone digital information comparison determining unit 1028 searches the IP network connection tone digital information storage unit 1025 according to the connection tone digital information thus generated. When the connection tone digital information comparison determining unit 1028 finds the IP network connection tone digital information corresponding to the connection tone digital information, the connection tone digital information comparison determining unit 1028 determines that the VoIP adaptor 10 is connected through the IP network 2, and generates the IP network connection signal.

On the other hand, when the connection tone digital information comparison determining unit 1028 does not find the IP network connection tone digital information corresponding to the connection tone digital information, the connection tone digital information comparison determining unit 1028 determines that the VoIP adaptor 10 is connected through the analog public telephone network 1, and generates the analog public network connection signal.

When the connection tone digital information comparison determining unit 1028 generates the IP network connection signal or the analog public network connection signal, the communication unit 102a sends the IP network connection signal or the analog public network connection signal to the control unit 101a.

In step S306, when the control unit 101a receives the IP network connection signal, the control unit 101a sets the IP network on/off area 1071 of the system memory 107 to on. In step S307, when the control unit 101a receives the analog public network connection signal, the control unit 101a sets the IP network on/off area 1071 of the system memory 107 to off.

When the control unit 101a sets the IP network on/off area 1071 of the system memory 107 to on or off, the control unit 101a instructs the communication protocol changing unit 110a to determine whether the communication protocol is changed. When the control unit 101a instructs the communication protocol changing unit 110a to determine whether the communication protocol is changed, the communication protocol changing unit 110a instructs the communication speed limit value changing unit 1104 to determine whether the communication speed limit value is changed.

Note that a process of the facsimile device 100a from step S308 to S313 is similar to the process of the facsimile device 100 from step S107 to S112, and an explanation thereof is omitted. Further, the operation of the facsimile device 100a as the reception side facsimile device is similar to that of the facsimile device 100 as the reception side facsimile device from step S201 to step S212, and an explanation thereof is omitted.

As described above, in the embodiment, when the facsimile device 100a is used as the transmission side facsimile device, it is determined whether the facsimile device 100a is connected to the reception side facsimile device through the IP network 2 according to the connection tone generated by the VoIP adaptor 10 when the facsimile device 100a is connected to the reception side facsimile device through the IP network 2. Accordingly, as compared with the facsimile device 100 in the first embodiment, it is possible to securely determine that the facsimile device 100a is connected through the IP network 2.

Third Embodiment

A third embodiment of the present invention will be explained next. Components in the third embodiment similar to those in the first and second embodiments are designated with the same reference numerals, and explanations thereof are omitted. The components similar to those in the first and second embodiments provide similar effects, and explanations thereof are omitted.

Figure 9:
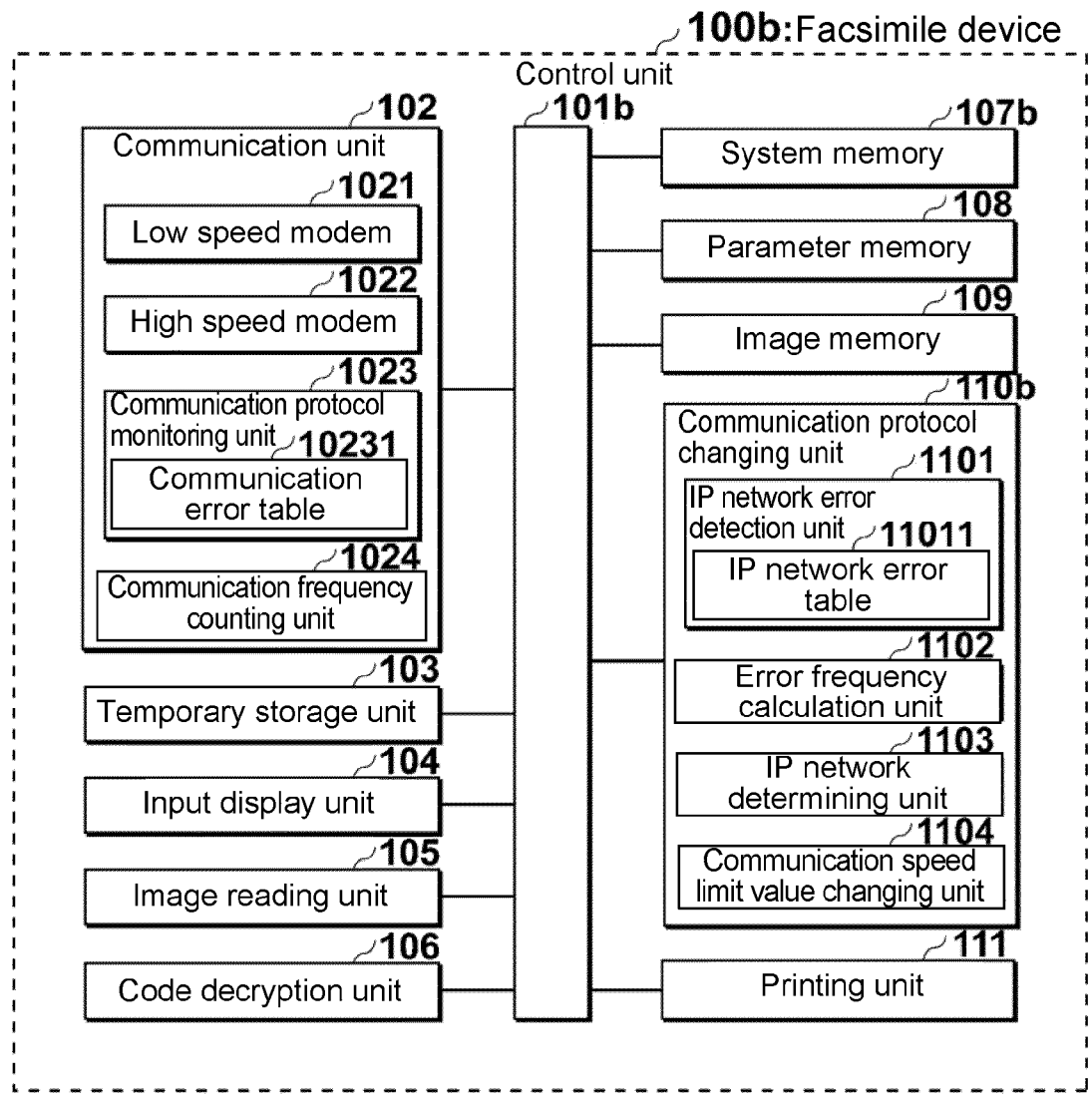
FIG. 9 is a schematic block diagram showing a configuration of a facsimile device according to a third embodiment of the present invention.

FIG. 9 is a schematic block diagram showing a configuration of a facsimile device 100b according to the third embodiment of the present invention.

In the embodiment, when the facsimile device 100b is used as the transmission side facsimile device, it is arranged to register destination information in a destination area 1075 (a determining unit) of a system memory 107b through a button of the input display unit 104. The destination information indicates the fax number of the reception side facsimile device and whether the facsimile device 100b is connected to the reception side facsimile device through the IP network 2 in the facsimile communication. Accordingly, the facsimile device 100b sets the value of the IP network on/off area 1071 of the system memory 107b according to the destination information of the reception side facsimile device in the facsimile communication.

As shown in FIG. 9, the facsimile device 100b includes a control unit 101b; the communication unit 102; the temporary storage unit 103; the input display unit 104; the image reading unit 105; the code decryption unit 106; the system memory 107b; the parameter memory 108; the image memory 109; a communication protocol changing unit 110b; and the printing unit 111.

FIG. 10 is a schematic view showing a configuration of the system memory 107b according to the third embodiment of the present invention.

As shown in FIG. 10, the system memory 107b includes the IP network on/off area 1071; the communication record storage area 1072; the total communication number area 1073; the IP network error total number area 1074; and the destination area 1075 for storing the destination information.

FIG. 11 is a schematic view showing the destination area 1075 of the system memory 107b according to the third embodiment of the present invention.

As shown in FIG. 11, the system memory 1075 stores the destination information including the fax number of the reception side facsimile device in the facsimile communication; an IP network setting indicating whether the facsimile device 100b is connected to the reception side facsimile device through the IP network 2; and an abbreviated number attached to the fax number.

In the embodiment, the operator of the facsimile device 100b sets the destination information through the input display unit 104, and is capable of changing values of the destination information already registered. Note that the operator knows whether the facsimile device 100b is connected to the reception side facsimile device through the IP network 2. Alternatively, when the communication error occurs during the facsimile communication between the facsimile device 100b and the reception side facsimile device, the operator may make a phone call and be able to set the IP network setting of the destination information.

An operation of registering the destination information in the facsimile device 100b will be explained next. First, in order to initiate the facsimile communication, the operator needs to register the destination information in the facsimile device 100b including the fax number of the reception side facsimile device. Accordingly, the operator operates the button of the input display unit 104 to select a destination information registration screen.

When the destination information registration screen is displayed on the touch panel display of the input display unit 104, the operator operates the button of the input display unit 104 to input a name and the fax number of the reception side facsimile device. Further, the operator sets the IP network setting to on or off; selects the abbreviated number; and pushes a registration button. When the operator pushes the registration button, the control unit 101b registers the destination information including the fax number, the IP network setting, and the abbreviated number in the system memory 1075 of the system memory 107b.

When the control unit 101b registers the destination information in the system memory 1075 of the system memory 107b, the control unit 101b starts a program stored in an ROM (not shown) to display a destination information registration completion notification screen on the touch panel display of the input display unit 104 indicating that the destination information is newly registered.

An operation of the facsimile device 100b as the transmission side facsimile device will be explained next. First, in order to initiate the facsimile communication, the operator operates the button of the input display unit 104 to select an abbreviated number selection screen. The abbreviated number selection screen displays the abbreviated number, and the name and the fax number of the reception side facsimile device corresponding to the abbreviated number. When the abbreviated number selection screen is displayed on the touch panel display of the input display unit 104, the operator operates the input display unit 104 to select the abbreviated number corresponding to the fax number of the reception side facsimile device, and pushes the start button.

When the operator pushes the start button, the control unit 101b searches the destination information stored in the system memory 1075 of the system memory 107b according to the abbreviated number thus selected. Further, the control unit 101b stores the fax number of the destination information corresponding to the abbreviated number in the temporary storage unit 103, and stores the value of the IP network setting (on or off) in the IP network on/off area 1071 of the system memory 107b.

In the next step, the control unit 101b generates the call signal (the CNG signal) for calling the reception side facsimile device, and sends the call signal to the communication unit 102. The fax number of the reception side facsimile device stored in the temporary storage unit 103 and a fax number of the facsimile device 100b stored in the parameter memory 108 are automatically added to the call signal (the CNG signal).

In the embodiment, when the communication unit 102 receives the call signal (the CNG signal) from the control unit 101b, the communication unit 102 sends the call signal (the CNG signal) to the fax number of the destination side facsimile device 200 or the destination side facsimile device 300.

After the communication unit 102 receives the common menu (the JM signal) from the reception side facsimile device, when the communication unit 102 receives the digital identification signal (the DIS signal) and the called terminal identification signal (the CSI signal) from the reception side facsimile device, the control unit 101b stores the reception capability of the reception side facsimile device attached to the digital identification signal (the DIS signal) and the identification information of the reception side facsimile device attached to the called terminal identification signal (the CSI signal) in the temporary storage unit 103. After the control unit 101b stores the reception capability and the identification information of the reception side facsimile device, the control unit 101b instructs the communication protocol changing unit 110b to determine whether the communication protocol is changed.

When the communication protocol changing unit 110b receives the instruction of determining the communication protocol, the communication protocol changing unit 110 instructs the communication speed limit value changing unit 1104 to determine whether the communication speed limit value is changed.

Note that the rest of the operation of the facsimile device 100b as the transmission side facsimile device is similar to that of the facsimile device 100 as the transmission side facsimile device, and an explanation thereof is omitted. Further, the operation of the facsimile device 100b as the reception side facsimile device is similar to that of the facsimile device 100 as the reception side facsimile device, and an explanation thereof is omitted.

Figure 12:
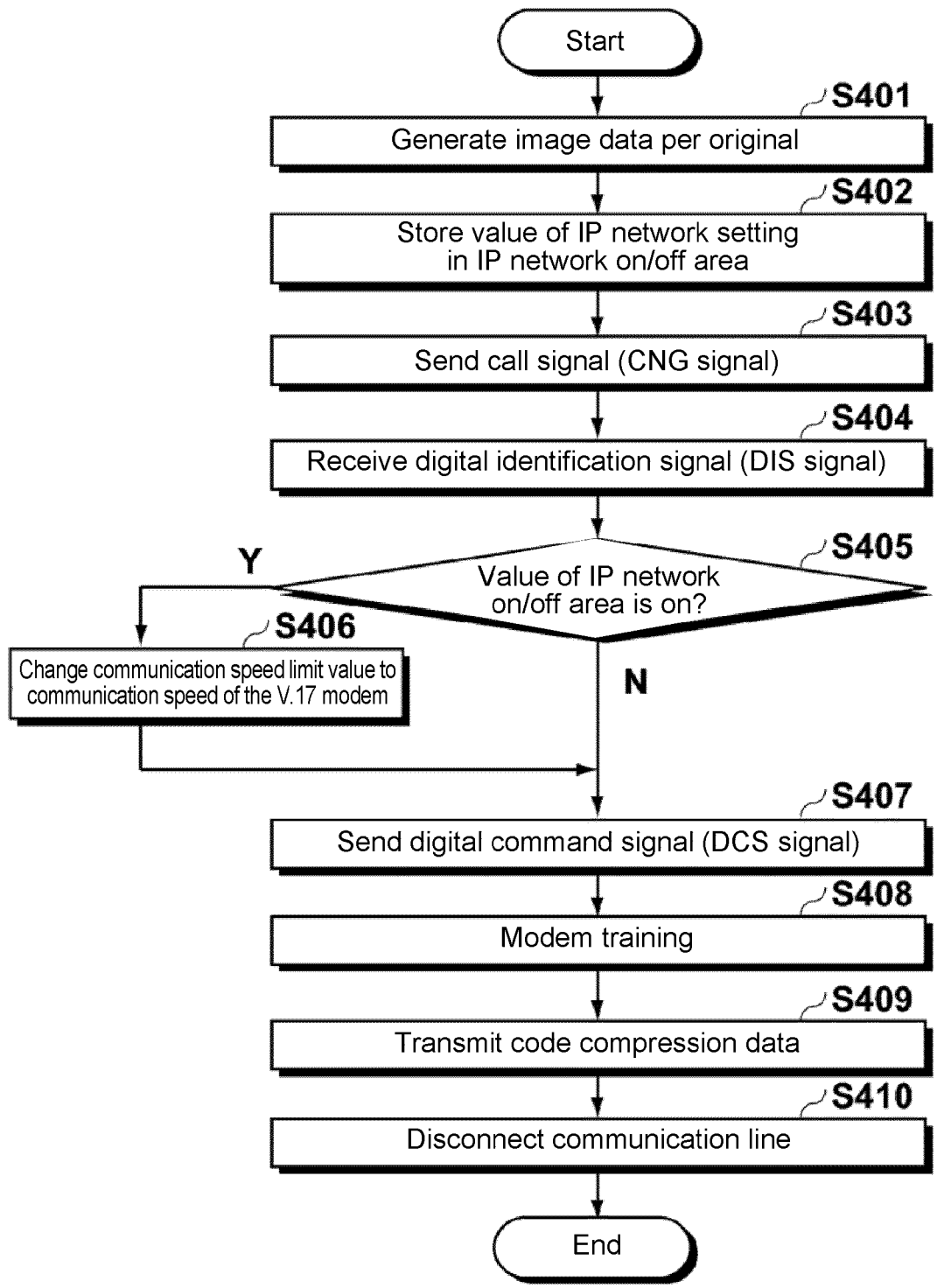
FIG. 12 is a flow chart showing a transmission operation of the facsimile device according to the third embodiment of the present invention.

An operation of the facsimile device 100b will be explained with reference to a flow chart. First, the transmission operation of the facsimile device 100a as the transmission side facsimile device will be explained with reference to FIG. 12. FIG. 12 is a flow chart showing the transmission operation of the facsimile device 100b according to the third embodiment of the present invention.

Note that a process of the facsimile device 100b in step S401 is similar to the process of the facsimile device 100 in step S101, and an explanation thereof is omitted.

First, in order to initiate the facsimile communication, the operator operates the button of the input display unit 104 to select the abbreviated number selection screen. The abbreviated number selection screen displays the abbreviated number, the name and the fax number corresponding to the abbreviated number. When the abbreviated number selection screen is displayed on the touch panel display of the input display unit 104, the operator operates the input display unit 104 to select the abbreviated number corresponding to the fax number of the reception side facsimile device, and pushes the start button.

When the operator pushes the start button, the control unit 101b searches the destination information stored in the system memory 1075 of the system memory 107b according to the abbreviated number thus selected.

In step S402, the control unit 101b stores the fax number of the destination information corresponding to the abbreviated number in the temporary storage unit 103, and stores the value of the IP network setting (on or off) in the IP network on/off area 1071 of the system memory 107b.

In the next step, the control unit 101b generates the call signal (the CNG signal) for calling the reception side facsimile device, and sends the call signal to the communication unit 102. The fax number of the reception side facsimile device stored in the temporary storage unit 103 and a fax number of the facsimile device 100b stored in the parameter memory 108 are automatically added to the call signal (the CNG signal).

In step S403, when the communication unit 102 receives the call signal (the CNG signal) from the control unit 101b, the communication unit 102 sends the call signal (the CNG signal) to the fax number of the destination side facsimile device 200 or the destination side facsimile device 300 through the VoIP adaptor 10.

In step S404, after the communication unit 102 receives the common menu (the JM signal) from the reception side facsimile device, when the communication unit 102 receives the digital identification signal (the DIS signal) and the called terminal identification signal (the CSI signal) from the reception side facsimile device, the control unit 101*b* stores the reception capability of the reception side facsimile device attached to the digital identification signal (the DIS signal) and the identification information of the reception side facsimile device attached to the called terminal identification signal (the CSI signal) in the temporary storage unit 103. After the control unit 101*b* stores the reception capability and the identification information of the reception side facsimile device, the control unit 101*b* instructs the communication protocol changing unit 110*b* to determine whether the communication protocol is changed.

When the communication protocol changing unit 110*b* receives the instruction of determining the communication protocol, the communication protocol changing unit 110 instructs the communication speed limit value changing unit 1104 to determine whether the communication speed limit value is changed.

Note that a process of the facsimile device 100*b* as the transmission side facsimile device from step S405 to step 410 is similar to that of the facsimile device 100 as the transmission side facsimile device from step S107 to S112, and an explanation thereof is omitted. Further, the operation of the facsimile device 100*b* as the reception side facsimile device is similar to that of the facsimile device 100 as the reception side facsimile device, and an explanation thereof is omitted.

As described above, in the third embodiment, when the facsimile device 100*b* is used as the transmission side facsimile device, the fax number of the reception side facsimile device and the IP network setting are stored as the destination information in the system memory 1075 of the system memory 107*b*. Accordingly, it is possible to determine that the facsimile device 100*a* is connected to the reception side facsimile device registered with the destination information through the IP network 2. As a result, as compared with the facsimile device 100 in the first embodiment or the facsimile device 100*a* in the second embodiment, it is possible to easily determine that the facsimile device 100*b* is connected through the IP network 2.

Further, in order to initiate the facsimile communication, the operator needs to register the fax number of the reception side facsimile device and the value of the IP network setting in the system memory 1075 of the system memory 107*b* in advance. Alternatively, it may be arranged such that the operator inputs the fax number of the reception side facsimile device and the value of the IP network setting before the facsimile communication starts without the registration process. Accordingly, it is possible to initiate the facsimile communication to the reception side facsimile device with the destination information not registered.

Further, after the facsimile communication with the reception side facsimile device is completed, it may be determined whether the fax number of the reception side facsimile device is registered in the destination information stored in the system memory 1075 of the system memory 107*b*. When the fax number of the reception side facsimile device is not registered yet, it may be arranged such that the fax number of the reception side facsimile device and the value of the IP network setting stored in the IP network on/off area 1071 are associated with the abbreviated number in a serial number, and are automatically registered in the destination information as new destination information. Accordingly, the operator searches the new destination information having a blank name through the input display unit 104, and is able to register the destination information simply by inputting the name of the reception side facsimile device.

In the embodiments described above, the facsimile device is explained as the communication device of the present invention. The present invention is applicable to a multi-function product (MFP) having a facsimile function.

The disclosure of Japanese Patent Application No. 2008-250731, filed on Sep. 29, 2008, is incorporated in the application by reference.

While the invention has been explained with reference to the specific embodiments of the invention, the explanation is illustrative and the invention is limited only by the appended claims.

What is claimed is:

1. A communication device, comprising:
    a communication controller configured to conduct communication with a destination device according to a first communication sequence or a second communication sequence more suitable for communicating through an IP network than the first communication sequence; and
    an IP network determiner configured to determine whether the communication is conducted through the IP network so that the communication control unit conducts the communication according to the second communication sequence when the IP network determining unit determines that the communication is conducted through the IP network,
    wherein said communication controller is arranged to start the communication according to the first communication sequence, said IP network determiner determining that the communication is conducted through the IP network when a frequency of a communication error generated under a specific condition of the first communication sequence exceeds a specific value.

2. The communication device according to claim 1, wherein said communication controller is arranged to conduct the communication according to the second communication sequence capable of dealing with various types of destination devices as compared with the first communication sequence.

3. The communication device according to claim 1, wherein said communication controller is arranged to conduct the communication according to the second communication sequence having a communication capability higher than that of the first communication sequence.

4. The communication device according to claim 1, wherein said communication controller is arranged to conduct the communication according to the second communication sequence at a communication speed greater than that of the first communication sequence.

5. The communication device according to claim 1, wherein said communication controller is arranged to conduct the communication according to the second communication sequence compliant with ITU-T standard V.34, and is arranged to conduct the communication according to the first communication sequence compliant with ITU-T standard V.17.

6. The communication device according to claim 1, wherein said IP network determiner is arranged to determine that the communication is conducted through the IP network when the frequency of the communication error generated under the specific condition of the first communication sequence exceeds the specific value, said specific condition including at least one of or a combination of a case that the communication device receives an invalid signal in a reception phase B of a sequence of ITU-T standard V.34 after the communication device sends a called menu (a CM signal) and waits for a common menu (a JM signal); a case that the communication device does not receive a sequence termination signal (a EOP signal) for 13 seconds in a reception phase C of a sequence of ITU-T standard V.34 or does not receive a specific time frame; a case that the communication device receives a invalid signal in a reception phase D of the sequence of the ITU-T standard V.34; and a case that a response reception is an error in a transmission phase D of the sequence of the ITU-T standard V.34.

* * * * *